US008204732B1

(12) United States Patent
Simsek et al.

(10) Patent No.: US 8,204,732 B1
(45) Date of Patent: Jun. 19, 2012

(54) MODELING COMMUNICATION INTERFACES FOR MULTIPROCESSOR SYSTEMS

(75) Inventors: Tunc Simsek, Newton, MA (US); Mani Ramamurthy, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 495 days.

(21) Appl. No.: 12/434,451

(22) Filed: May 1, 2009

Related U.S. Application Data

(60) Provisional application No. 61/102,502, filed on Oct. 3, 2008.

(51) Int. Cl.
*G06F 17/50* (2006.01)

(52) U.S. Cl. ............... 703/16; 703/17; 703/21; 709/224; 717/104

(58) Field of Classification Search ............... 703/13–17, 703/21; 717/104, 105; 709/224
See application file for complete search history.

(56) References Cited

U.S. PATENT DOCUMENTS

| 7,145,898 | B1 * | 12/2006 | Elliott ........................... 370/352 |
| 7,869,425 | B2 * | 1/2011 | Elliott et al. ................... 370/352 |
| 7,885,902 | B1 * | 2/2011 | Shoemaker et al. ........... 705/319 |
| 7,925,490 | B2 * | 4/2011 | Calvez ............................ 703/17 |
| 7,991,603 | B2 * | 8/2011 | Calvez ............................ 703/13 |
| 2004/0133861 | A1 * | 7/2004 | Bollano et al. .................... 716/4 |
| 2006/0282252 | A1 | 12/2006 | Ciolfi |
| 2008/0004851 | A1 * | 1/2008 | Calvez ............................ 703/13 |
| 2008/0243464 | A1 * | 10/2008 | Calvez ............................ 703/17 |

OTHER PUBLICATIONS

Canfora et al, Recovering the Architectural Design for Software Comprehension, IEEE Third Workshop on Program Comprehension, 1994, pp. 30-38.*

* cited by examiner

*Primary Examiner* — Russell Frejd
(74) *Attorney, Agent, or Firm* — Harrity & Harrity, LLP

(57) ABSTRACT

In an embodiment, a graphical model may include a functional portion and a architectural portion. The architectural portion may describe a multiprocessor system. Inter-process communication blocks may be defined that describe the connectivity of functional blocks in the deployed version of the model. The IPC blocks may describe the connectivity of the blocks independent of the communication channel(s) that connect the processor nodes in the multiprocessor system.

34 Claims, 18 Drawing Sheets

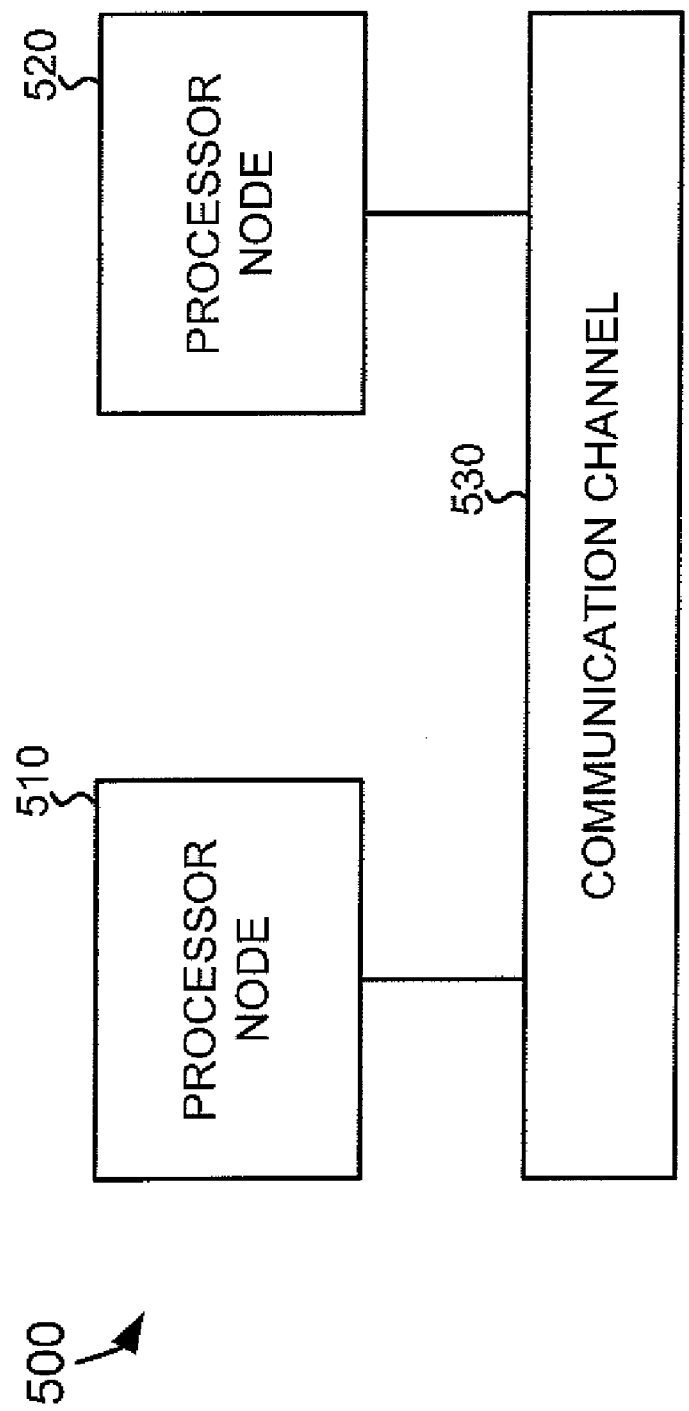

```
class CANBusRead < simulink.ArchitecModeling.IPCType
methods
    function Setup(blk)
        blk.addDialogPrm('MessagePriority', ...    %parameter name
            'Message priority', ...                 %parameter prompt
            'edit', ...                             %parameter type
            '1');                                   %default value
        blk.addDialogPrm('MessageHeaderSize', ...  %parameter name
            'Message header size', ...              %parameter prompt
            'combobox', ...                         %parameter type
            '11', ...);                             %default value
    end
    function CheckPrms(blk)
        if blk.DialogPrm('MessagePriority').Data < 0
            error('Message priority must be pos integer');
        end
    end
    function DoPostProp(blk)
        blk.NumDataStores = 1                       %register one datastore
        blk.DataStore(1).Name = 'Handle';           %name of registered store
    end
end
```

1310 → function Setup(blk)
1320 → function CheckPrms(blk)
1330 → function DoPostProp(blk)

```
%function Start(blk)
  %%Emit initialization code to initialize device driver and store
  %%the result in the data store 'Handler'. The initialization is a function
  %%of the MessageMode parameter.
  CANInitialize(%<LibGetBlkDataSToreAddr(blk,0)>, ...
                %<blk.ParamSettings.MessageMode>);
%end
```
— 1410

```
%function Terminate(blk)
  %%Emit termination code to shutdown the device driver indicated
  %%by 'Handle' data store.
  CANShutdown(%<LibGetBlkDataStoreAddr(blk,0)>);
%end
```
— 1420

```
%function Outputs(blk)
  %%Emit code to read data from the device driver indicated by the
  %%'Handle' data store. The data is identified by the 'MessagePriority'
  %%and 'MessageHeaderSize' parameters.
  CANRead(%<LibGetBlkDataStoreAddr(blk, 0)>, ...
          %<LibBlkOutputSignalAddr(blk, 0)>, ...
          %<blk.ParamSettings.MessageHeaderSize>);
%end
```
— 1430

FIG. 14

MODELING COMMUNICATION INTERFACES FOR MULTIPROCESSOR SYSTEMS

CROSS REFERENCE TO RELATED APPLICATION

The instant application claims priority from provisional application No. 61/102,502, filed Oct. 3, 2008, the disclosure of which is incorporated by reference herein in its entirety.

BACKGROUND

Technical computing environments are known that present a user, such as a scientist or engineer, with an environment that enables efficient analysis and generation of technical applications. For example, users may perform analyses, visualize data, and develop algorithms. Technical computing environments may allow a technical researcher or designer to efficiently and quickly perform tasks such as research and product development.

Existing technical computing environments may be implemented as or run in conjunction with a graphically-based environment. For example, in one existing technical computing environment that is run in conjunction with a graphically-based environment, graphical simulation tools allow models to be built by connecting graphical blocks, where each block may represent an object associated with functionality and/or data.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 5A and 5B are diagrams illustrating an exemplary architectural model;

FIG. 13 is a diagram illustrating a set of exemplary callback functions for an IPC read block for use during model simulation;

FIG. 14 is a diagram illustrating a set of exemplary callback functions for an IPC setup block and an IPC read block for use during code generation for deployment on a real-time target;

DETAILED DESCRIPTION

Figure 1:
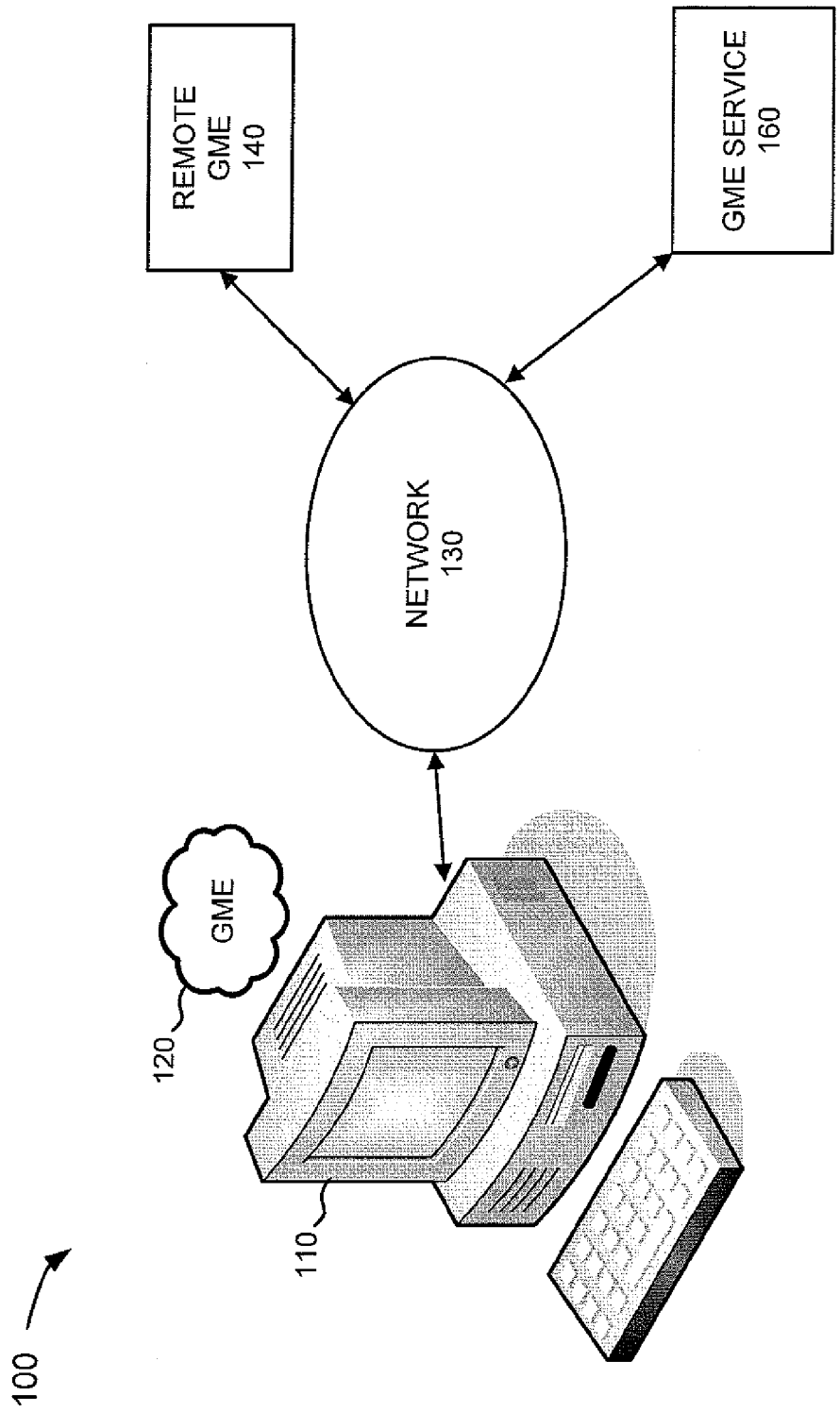
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

In modeling a system in a graphical modeling environment (GME), the system to be modeled may include a multiprocessor system such as a distributed embedded system or a parallel computing system. In a distributed embedded system, each processor may have a defined role and may perform different tasks from other processors. A parallel computing system may include multiple processors packaged as a unit in which a large problem is decomposed to smaller problems that can be run in parallel on the multiple processors.

Graphically represented blocks (i.e., functional elements) that are to be executed by different processors may need to communicate with one another over one or more logical channels that connect the blocks on different processors. A "channel," when eventually implemented in the run-time environment may correspond to, for example, a low-level local electrical bus, a network connection, or a long distance optical connection.

Models generated with graphical modeling tools may be simulated on a host computer or converted to computer code by the graphical modeling tool. The computer code can then be executed in the target multiprocessor environment. Graphical modeling tools may allow the user to separately specify an architectural model of the physical system, such as the number of processors and the communication channels through which they are connected, and the algorithm that is to be implemented by the model. A final, executable version of the model may then be based on a mapping of the functional model to the architectural model.

Overview

Implementations described herein relate to a graphical modeling environment (GME). The GME may be a part of or incorporate a technical computing environment (TCE). The models may include an architectural model that defines a physical or conceptual implementation of a multiprocessor system and a functional model that defines a desired algorithm that is to be implemented by the model. The architectural and functional versions of the model may be combined to create a version of the model that can be deployed in a target environment. In an implementation, inter-process communication (IPC) blocks may be defined that describe a connectivity of functional blocks in a deployed version of the model. The IPC blocks may describe functional properties of the communication, such as the connectivity of the blocks and the communication timing, independently of physical details of one or more communication channels that connect processor nodes in the multiprocessor system. The IPC blocks may then be further customized using an authoring language, as part of an application programming interface (API), to describe deployment details of communication interfaces that attach the processor nodes to one or more communication channels. The communication channels may be defined such that they describe functional properties of the communication, such as Bit Error Rate (BER) or latency, independently of the processor nodes and independently of the IPC blocks which are communicating data over the channels. A functionality of the communication between the processor nodes may be derived based on the communication interfaces and the functional properties of communication. The functionality of communication may be derived, for example, while evaluating or compiling the model. Note that the communication interfaces and the functional properties of the communication may be described in a partial manner such that the GME propagates and derives a functionality of the communication based on partial information.

DEFINITIONS

A "multiprocessor system" may be defined as a computing system in which multiple processors or processor cores communicate over one or more channels to execute a task. Each processor or processor core in a multiprocessor system may be referred to as a "processor," "processor node," or "node" herein. Distributed embedded systems and task parallel computing systems are examples of multiprocessor systems.

A "functional model," as used herein, may refer to a model that implements algorithmic elements in which a designer is interested. Generally, the functional model may be created without regard to implementation details of the physical system that is to implement the model. The "architectural model" or "deployment model," as used herein, may refer to a target system in which the functional model is to be implemented. The deployment model may generally describe capabilities of the physical system such as its computational resources, memory resources and additional physical devices for which the functional model will be implemented. Consideration of the details of the physical system with respect to the requirements of the algorithmic elements in the functional model may be resolved as part of a mapping of the functional model to the architectural model.

The models described herein may be created in a graphical modeling environment (GME). The GME may incorporate or be part of a technical computing environment that may include any hardware and/or software based logic that provides a computing environment that allows users to perform tasks related to disciplines, such as, but not limited to, mathematics, science, engineering, medicine, business, etc.

The GME may further provide mathematical functions and/or graphical tools or blocks (e.g., for creating plots, surfaces, images, volumetric representations, etc.). In an implementation, the GME may provide these functions and/or tools using toolboxes (e.g., toolboxes for signal processing, image processing, data plotting, parallel processing, etc.). In another implementation, the GME may provide these functions as block sets. In still another implementation, the GME may provide these functions in another way, such as via a library, etc.

The GME may implement an environment that provides for the graphical creation of models that are defined by users to implement desired functionality. Certain aspects of the GME, as it relates to the creation of models, will be described in more detail below.

System Description

FIG. 1 is an exemplary diagram of a system 100 in which concepts described herein may be implemented. The system may include a personal computer or workstation 110. Workstation 110 may execute a graphical modeling environment (GME) 120 that presents a user with an interface that enables efficient analysis and generation of technical applications. For example, GME 120 may provide a numerical and/or symbolic computing environment that allows for matrix manipulation, plotting of functions and data, implementation of algorithms, creation of user interfaces, and/or interfacing with programs in other languages.

Workstation 110 may operate as a single detached computing device. Alternatively, workstation 110 may be connected to a network 130, such as a local area network (LAN) or wide area network (WAN) such as the Internet. When workstation 110 is connected to a network, GME 120 may be run by multiple networked computing devices or by one or more remote computing devices. In such an implementation, GME 120 may be executed in a distributed manner, such as by executing on multiple computing devices simultaneously. Additionally, in some implementations, GME 120 may be executed over network 130 in a client-server relationship. For example, workstation 110 may act as a client that communicates with, using a web browser, a server that stores and potentially executes the GME program.

For example, as shown in FIG. 1, system 100 may include a remote GME 140 (e.g., a remotely located computing device running a GME) and/or a GME service 160. GME service 160 may include a server computing device that provides a GME as a remote service. For instance, a GME may be provided as a web service. The web service may provide access to one or more programs provided by GME service 160.

Figure 2:
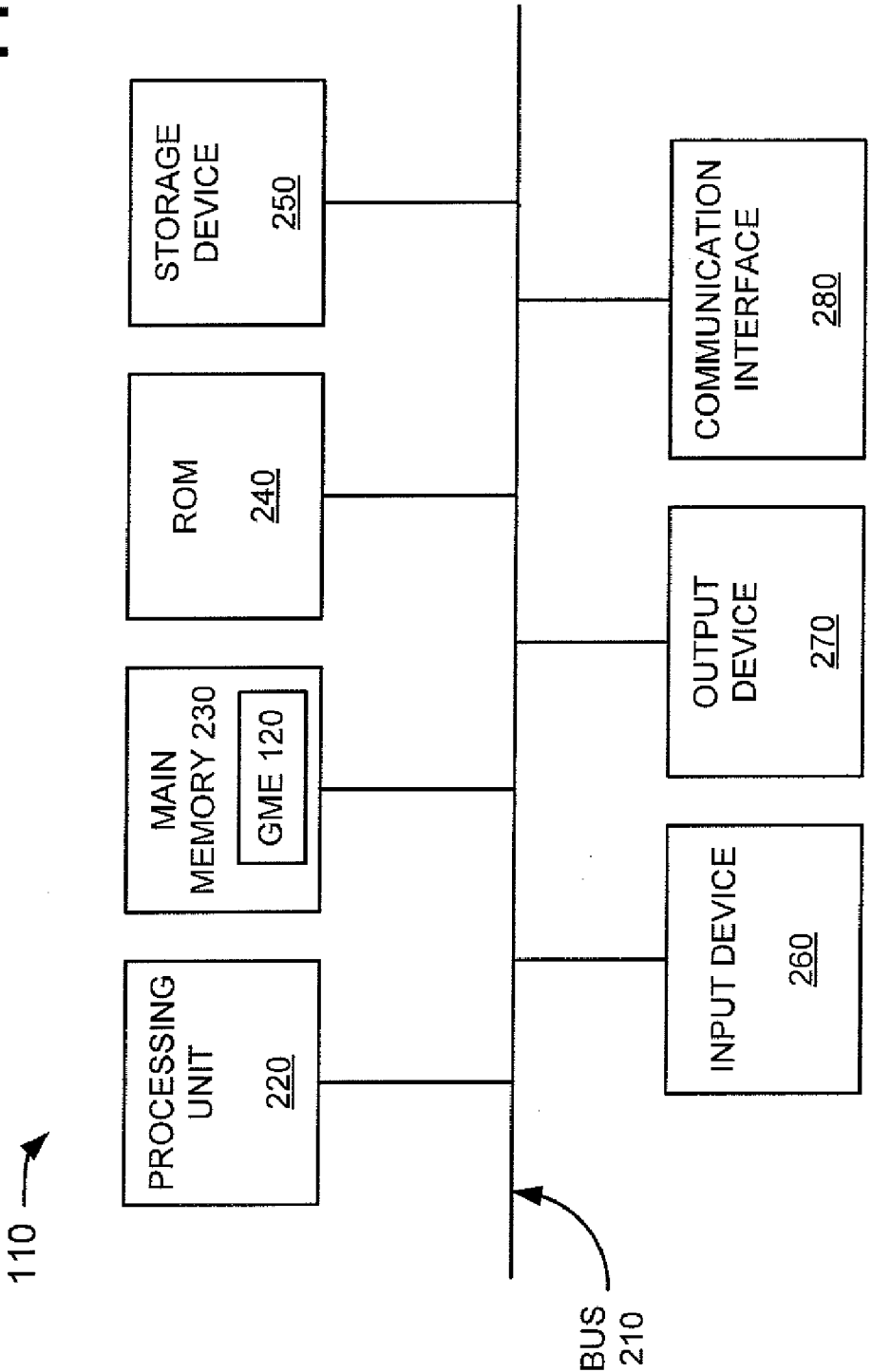
FIG. 2 is a diagram of an exemplary device corresponding to a workstation or a remote device running a remote graphical modeling environment (GME) or GME service.

FIG. 2 is a diagram of an exemplary device corresponding to workstation 110 or a remote device running remote GME 140 or GME service 160. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to workstation 110, such as a keyboard, a mouse, a pen, a single- or multi-point interface such as a touchpad, a microphone, an accelerometer, gyroscope, a neural interface, voice recognition and/or biometric mechanisms, etc. Output device 270 may include a mechanism that outputs information to the operator, including a display, a printer, a speaker, etc. Communication interface 280 may include any transceiver-like mechanism that enables workstation 110 to communicate with other devices and/or systems. For example, communication interface 280 may include mechanisms for communicating with another device or system via a network, such as network 130.

As will be described in detail below, workstation 110 may perform certain operations in response to processing unit 220 executing software instructions contained in a computer-readable medium, such as main memory 230. For instance, workstation 110 may implement GME 120 by executing software instructions from main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing unit 220 to perform processes that will be described later. Alternatively, hard-wired circuitry may be used in place of or in combination with software instructions to implement processes described herein. Thus, implementations described herein are not limited to any specific combination of hardware circuitry and software.

Although FIG. 2 shows exemplary components of workstation 110, in other implementations, workstation 110 may contain fewer, different, or additional components than depicted in FIG. 2. In still other implementations, one or more components of workstation 110 may perform one or more tasks performed by one or more other components of workstation 110.

Multiprocessor System Model

Figure 3:
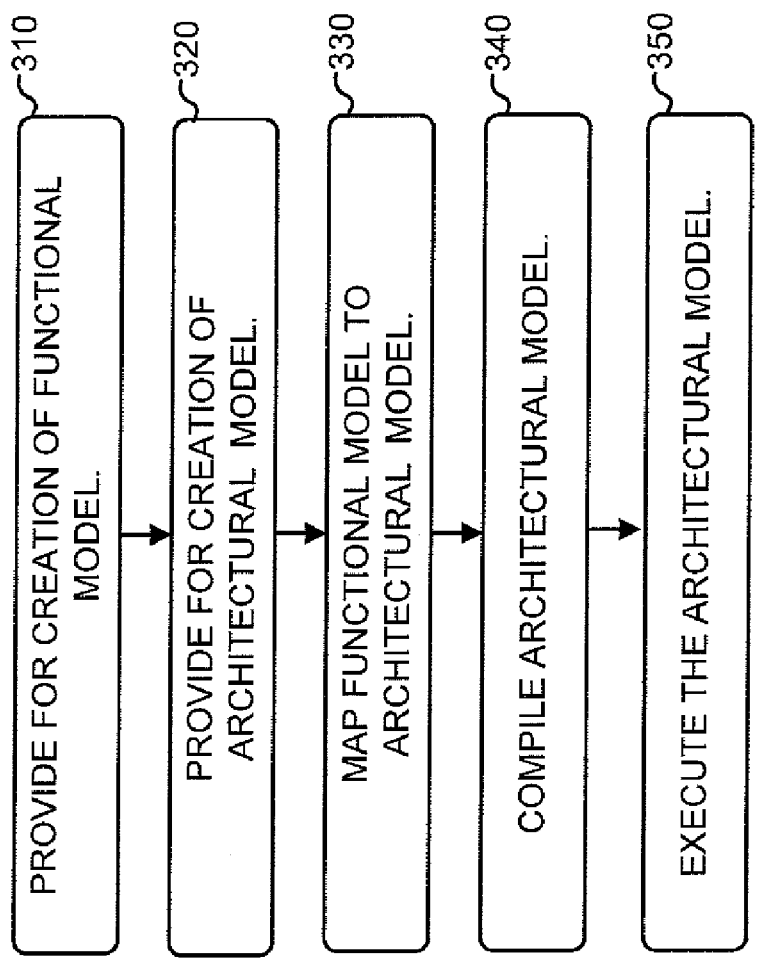
FIG. 3 is a flow chart illustrating exemplary operations through which a GME may be used to create graphical models.

FIG. 3 is a flow chart illustrating exemplary operations (acts) through which GME 120 may be used to create graphical models for implementation in a multiprocessor system. A model may be, for example, any equations, assignments, constraints, computation, algorithm, or process flow in which the user is interested. The model may be implemented as, for example, time-based block diagrams (e.g., the Simulink® product, available from The MathWorks, Incorporated), discrete-event based diagrams (e.g., SimEvents® product, available from The MathWorks, Incorporated), dataflow diagrams, state transition diagram (e.g. Stateflow® product, available from The MathWorks, Incorporated), and/or software diagrams. Models may be used in many different applications. For example, a model may represent a control process for a vehicle in which the model controls certain components of the vehicle based on input received from sensors in the vehicle. As another example, a model may be used to control various stations in an industrial assembly line. It can be appreciated that these two model examples are not limiting, and in general, a graphical model can be used to implement any number of systems, processes, or algorithms. A physical system that implements the deployed version of the model may be a multiprocessor system. The multiprocessor system may include multiple processors or nodes wherein a processor or node in the multiprocessor system may be a general purpose processor, a multi-core processor, application specific instruction-set processor (ASIP), graphics processor, field programmable gate array (FPGA), a programmable logic device, an application specific integrated circuit (ASIC). A node may further be implemented as an abstract process in the form of a task, process, or thread (light-weight process). In a multiprocessor system, multiple processor nodes, potentially executing in parallel, may implement functionality described by the model. The nodes may be configured to communicate (e.g., exchange data) over one or more communication channels. Examples of a communication channel may include a general purpose network, shared memory access, a physical bus or an access protocol, which may implement Controller Area Networks (CAN), Ethernet, Transmission Control Protocol/Internet Protocol (TCP/IP), etc. It can be desirable, when designing a model that is to be deployed in a multiprocessor system, to separate the functional aspects of the model from the physical aspects of the model. In this way, the designer can, when designing the model, initially focus on functional aspects of the model without distraction as to implementation details of the multiprocessor system in which the model may be deployed. The implementation details of the system may be considered as part of a mapping of the functional aspects of the model to architectural elements.

Referring to FIG. 3, GME 120 may provide for the creation of a functional model (block 310). GME 120 may, for example, provide one or more graphical interfaces through which a user can arrange graphical blocks that represent functionality and/or data. A graphical block may itself be defined using one or more graphical blocks to create model sub-systems. At some level, blocks may be defined via computer code. Users of GME 120 may obtain blocks that define different functions by using, for example, blocks written by a manufacturer of the GME 120, from third parties, or by defining their own custom blocks. In alternative implementations, the functional model may be represented as, for example, a state transition diagram instead of a block diagram.

Figure 4:
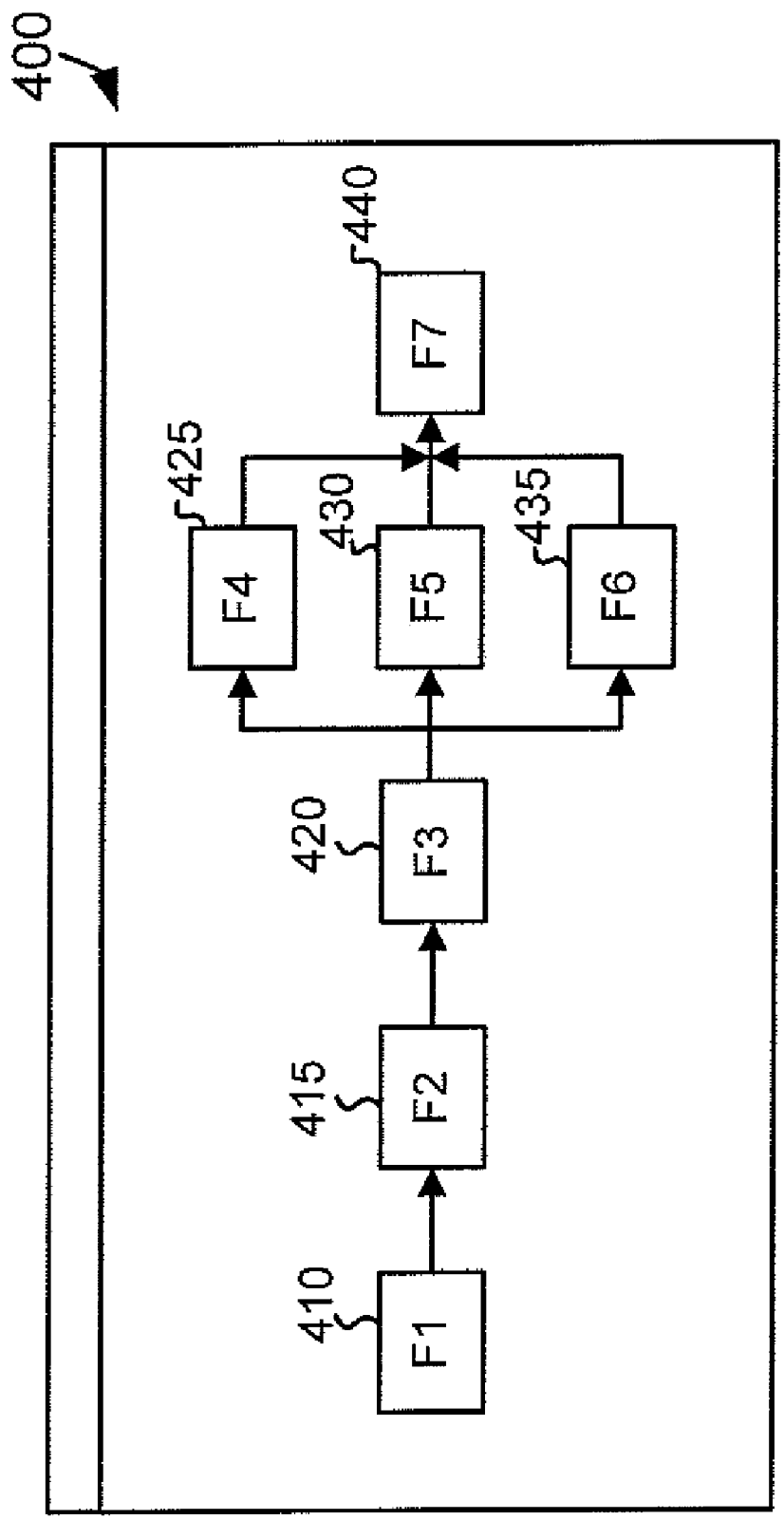
FIG. 4 is a diagram illustrating an exemplary functional model.

FIG. 4 is a diagram illustrating an exemplary functional model 400. Functional model 400 contains seven blocks, including blocks F1 410, F2 415, F3 420, F4 425, F5 430, F6 435, and F7 440. Each block 410 through 440 may represent functionality and/or a source of data. For instance, block F1 may represent input from a network or sensor, blocks F2, F3, and F4 may represent sequential processing that is performed on the sensor data, blocks F4, F5, and F6 may represent different functions that are independently performed on the output of block F3, and block F7 may be an output block. Lines between the blocks may represent data flow or, more generally, block connectivity. GME 120 may provide an interface through which users can add, remove, and modify blocks 410 through 440. In an implementation, GME 120 may provide a number of block libraries, for example, organized by technical discipline, through which users can select blocks and add the selected blocks to a model.

When designing functional model 400, the user, in general, may not need to be concerned with the details of how the model will be finally deployed.

Referring back to FIG. 3, GME 120 may also provide for the creation of an architectural model (block 320). GME 120 may, for example, provide one or more graphical interfaces through which a user can arrange graphical blocks that represent functionality of the multiprocessing system on which functional model 400 is to be deployed.

FIG. 5A is a diagram illustrating an exemplary architectural model 500. As shown in FIG. 5A, model 500 is a model of a system that includes two connected processors. In particular, model 500 includes two processor nodes 510 and 520 and a communication channel 530, each of which may be represented by a corresponding graphical block. Processor nodes 510 and 520 may model the behavior of each of the two respective processor nodes. Communication channel 530 may similarly model the behavior of the communication channel that connects the processor nodes.

Figure 5B:
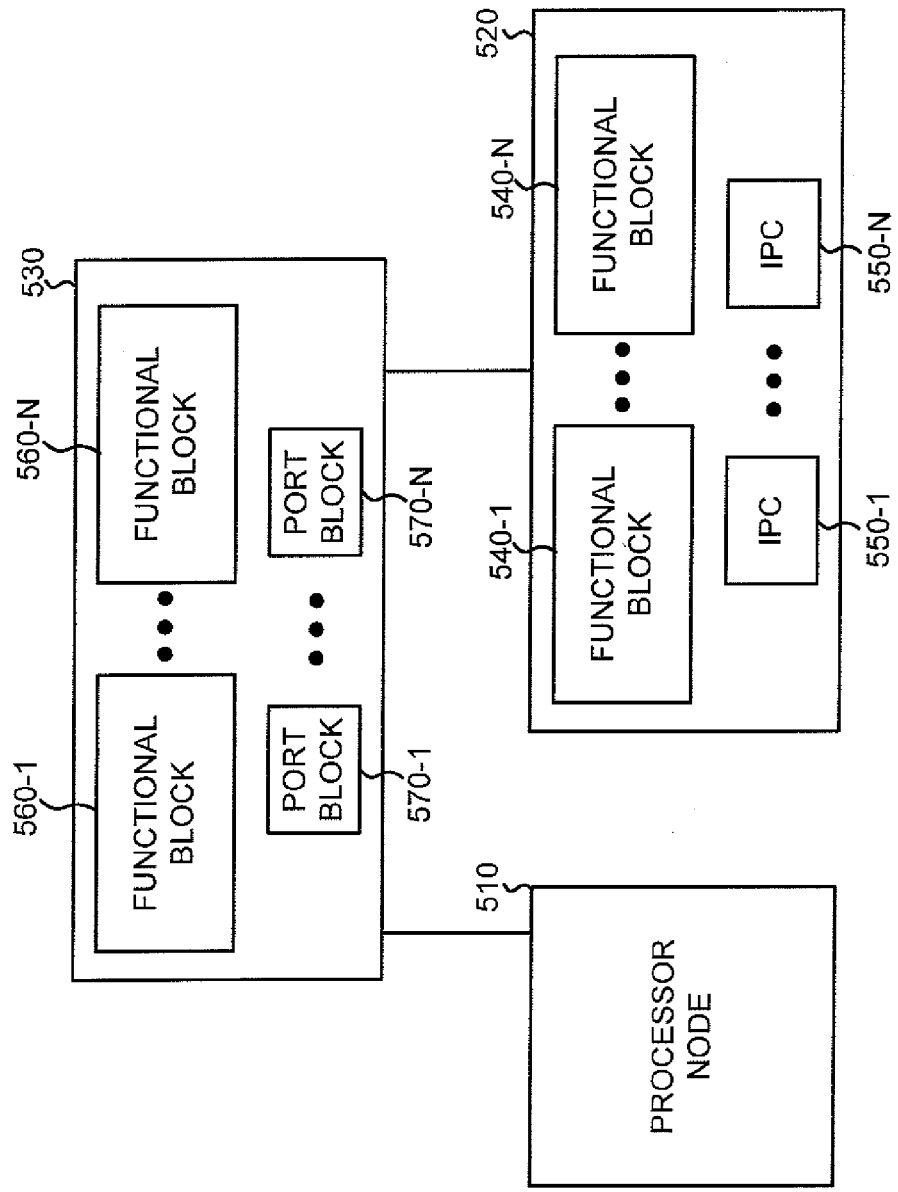

FIG. 5B is a diagram illustrating the processor node 520 and the communication channel 530, from FIG. 5A, in additional detail. Processor node 520 may include a number of functional blocks, shown as blocks 540-1 through 540-N (collectively functional blocks 540), and one or more inter-process communication (IPC) blocks 550-1 through 550-N (collectively IPC blocks 550). Functional blocks 540 may correspond to functional blocks 410 through 440 (FIG. 4), which describe the algorithm or computation that is to be modeled. Functional blocks 540 may not initially be present in architectural model 500. That is, architectural model 500 may initially be created without functional blocks included in processor nodes 510 and 520, and the functional blocks may then be mapped to architectural model 500, as will be discussed in more detail below.

IPC blocks for a processor node may describe an interface that the processor node sees to a communication channel. Thus, for example, IPC blocks 550-1 to 550-N may describe an interface that processor node 520 sees to communication channel 530. The IPC blocks 550 may include, for instance, a "read" block and a "write" block that may be configured to implement reading and writing to the channel 530, respectively.

Communication channel 530 may include one or more channel functional blocks 560-1 through 560-N that describe the behavior of the channel. Communication channel 530 may also include port blocks 570-1 through 570-N which describe connection ports attached to the channel 530. The blocks that define communication channel 530 may, for instance, model properties of channel 530 such as the bandwidth of the channel, an error rate of the channel (e.g., bit error rate (BER) or packet error rate (PER)), the latency of the channel, or other properties relating to the channel. A model of channel 530 may be designed to be a model of an expected implementation of channel 530, such as, for example, a network connection, a direct physical connection (e.g., a serial bus), or a shared memory connection.

Channel functional blocks 560 and port blocks 570 of communication channel 530 may be associated with one or more parameters that define the operation of blocks 560 and port blocks 570. For example, if a block 560 introduces a network delay, a parameter associated with this block 560 may be the amount of delay, delay probability distribution that may be defined by mean and variance parameters, or maximum delay for the block 560. GME 120 may allow channel designers to define a mask for the parameters of communication channel 530, where the mask specifies which parameters for communication channel 530 are to be "public" parameters (i.e., the parameters that can normally be altered by external processor nodes or functional blocks) for communication channel 530.

A channel, such as communication channel 530, may also be specified as a library of different implementations at different levels of abstraction. For instance, a channel model of a bus may be expressed as a variable delay or in much more detail as a discrete-event model. Users may be allowed to use a user-interface to select a specific channel model from among the several implementations in the library for a simulation run of their deployment model to implement the channel. Additionally, a choice from the library may be made in an automated fashion based on actual signals being communicated on the channel. For instance, if the data being communicated is a vector of values, the channel may automatically configure itself to be an implementation that decomposes each vector element to a separate packet that is then passed through the channel. It should also be noted that within the library of implementations for a channel, one may also use an implementation that involves co-simulating with another software environment. For example, among different models of a bus in a library of channel models could be a bus which is in co-simulation with a System-C environment that has a full specification of the bus in the System-C language.

Referring back to FIG. 3, functional model 400 may be mapped to architectural model 500 (block 330). Mapping the functional model to the architectural model may generally involve assigning functional units (e.g., blocks) in functional model 400 to the processing nodes and/or the communication channel in the architectural model 500. In some implementations, the mapping of the functional model to the architectural model may be performed automatically by GME 120 or semi-automatically in which the user may guide GME 120 in mapping the functional units to the architectural model. When automatically or semi-automatically mapping the functional model to the architectural model, GME 120 may use algorithmic blocks of the processor nodes and communication channel(s) to optimize assignment of functional units to processor nodes. For example, if a communication channel, such as channel 530, has a low bandwidth, functional blocks that have a high inter-block data connection may tend to be mapped to the same processor nodes. In other implementations, the mapping may be performed manually, in which, for example, a user may map functional units to processing nodes in architectural model 400.

As part of the mapping process, certain properties of the functional blocks may be reconfigured or partially reconfigured in order to meet various algorithmic requirements of functionality with respect to capabilities and resources provided by hardware and/or other architectural elements. For example, as part of the mapping, fixed-point data types may be reconsidered to make use of available word-sizes on target hardware. As another example, values of certain closed-loop gains may be readjusted to account for delays which may be incurred as a result of communication from one node to another.

Various properties of the functional blocks may be partially specified. Here, the GME may propagate, complete, and select the partially specified properties based on hardware and other architectural resources available. For example, the GME may select data types of block outputs to be the largest possible word size for accuracy or the smallest possible word size based on memory optimization settings.

Figure 6:
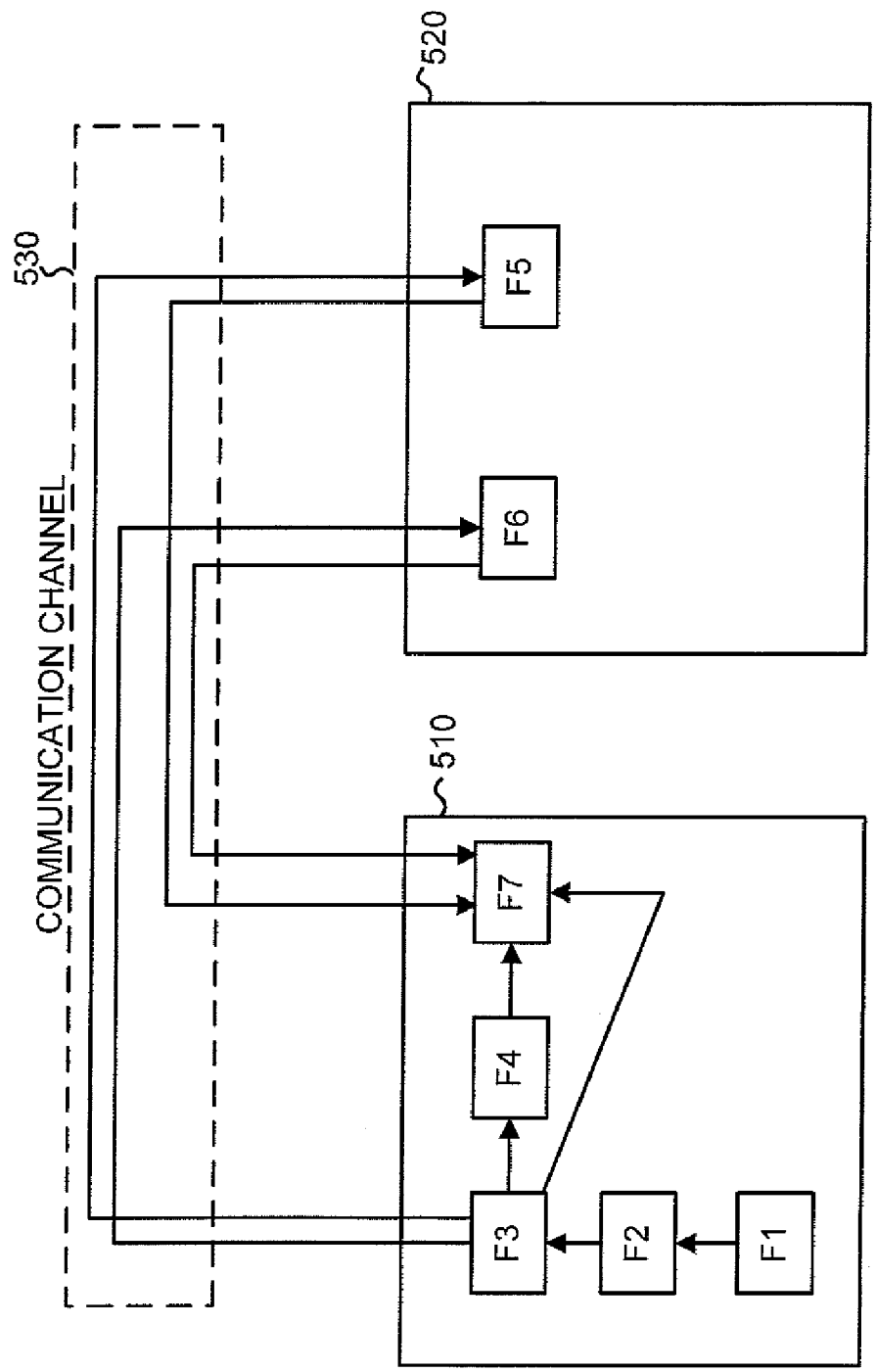
FIG. 6 is a diagram illustrating an exemplary mapping of a functional model to an architectural model.

FIG. 6 is a diagram illustrating an exemplary mapping of functional model 400 to architectural model 500. In this example, assume that processor node 510 is connected to an input sensor from which block F1 receives data. From functional model 400, assume that functional blocks F1, F2, and F3 must execute sequentially with respect to one another. That is, block F2 operates on data output from block F1 and block F3 operates on data output from block F2. Blocks F4, F5, and F6 depend on the output of block F3 and block F7 receives the outputs of each of blocks F4, F5, and F6. In FIG. 6, blocks F1, F2, F3, F4, and F7 are associated with processor node 510 and blocks F5 and F6 are associated with processor node 520. Communications between the functional blocks in processor node 510 and 520 are shown as lines through communication channel 530. In operation, a complete execution period of model 400 may include receiving data at processor node 510, sequentially executing blocks F1, F2, and F3 by processor node 510, transmitting output data from block F3 over communication channel 530 to processor node 520, processing blocks F4 by processor node 510 while simultaneously processing blocks F5 and F6 by processor node 520, transmitting data over communication channel 530 back to block F7, and implementing block F7 by processor node 510.

Referring back to FIG. 3, functional model 400, after being mapped to architectural model 400, may be compiled for execution in a target environment (block 340). In the example of FIG. 6, for instance, blocks F1, F2, F3, F4, and F7 may be compiled to execute on processor node 510 and blocks F5 and F6 may be compiled to execute on processor node 520.

The final deployed model may next be simulated on a host environment (e.g., workstation 110) or executed in the target environment (block 350). The target environment may include any of a number of arrangements of multiprocessor computing devices. For example, the target environment may include a distributed embedded system or a parallel computing system.

Figure 7:
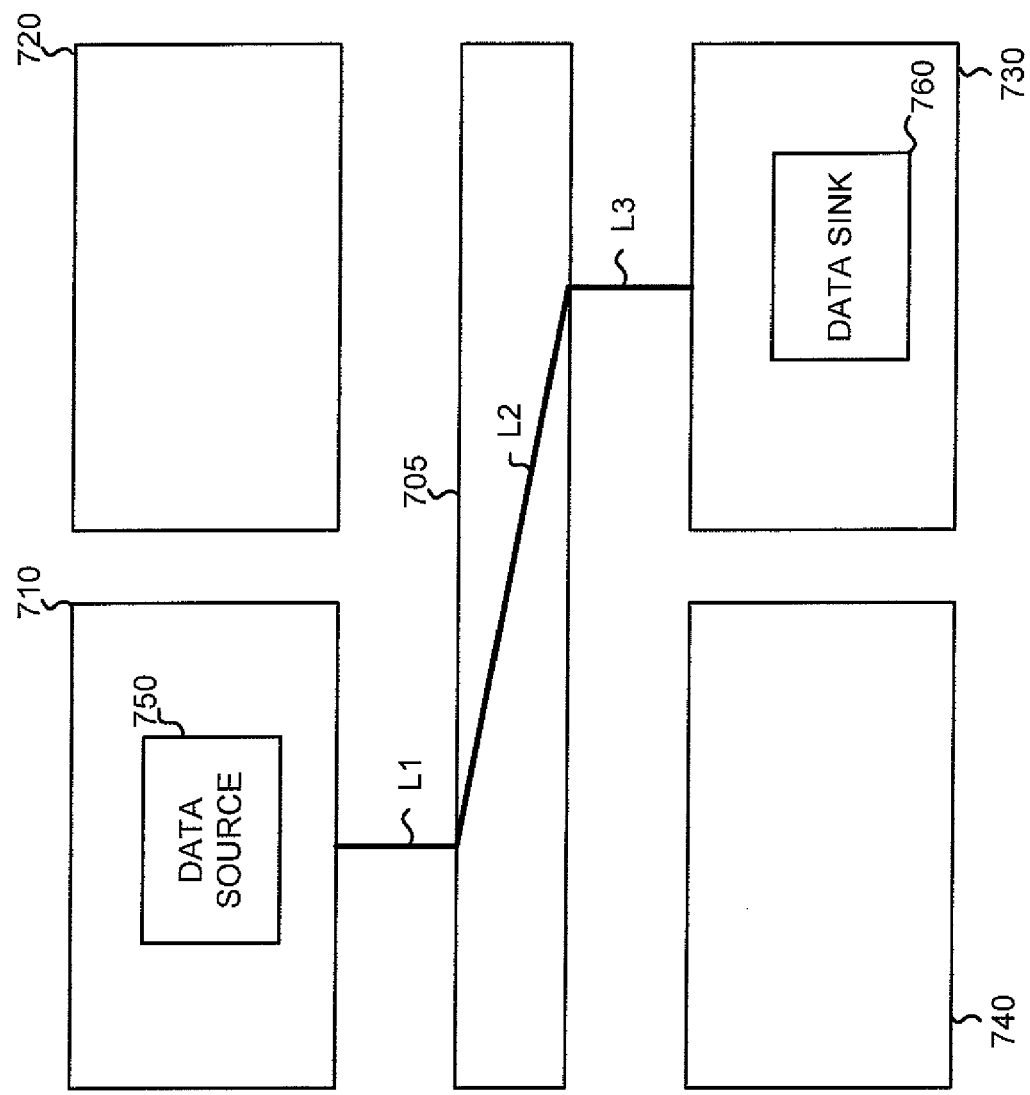
FIG. 7 is a diagram illustrating connectivity between processor nodes specified through a communication channel.

When mapping the functional model to the architectural model, connectivity between functional blocks located at different processing nodes may be specified. In existing systems, connectivity of functional blocks amongst different processing nodes may be specified as an aggregate connection path including links from a processor node to an input of the channel, from the input of the channel to an output of the channel, and from the output of the channel to the input of the destination processor node. This process is conceptually illustrated in FIG. 7, in which four processor nodes 710, 720, 730, and 740 are connected by a channel 705. Assume that a functional block 750 in processor node 710 generates data, (i.e., it functions as a data source) that is to be input to a functional block 760 to use the data (i.e., it is a data sink for the data generated by functional block 750). As shown in FIG. 7, three different communication links (L1, L2, and L3) are specified and each link may need to be separately specified. The links may be manually specified through various points in channel 705, such as the link, L1, from functional block 750 to a first input port of channel 705.

Specifying connectivity as separate links that traverse channel 705, as shown in FIG. 7, can have a number of disadvantages. For example, the logical connectivity of functional blocks amongst different processing nodes may depend on the content and the implied connectivity of the communication channel. Therefore, if a different communication channel is used, the logical connectivity of the functional blocks may change. Connecting additional processing nodes to the channel may require a change in the description of the channel. This is because the description of the channel may depend on the number of communication interfaces that are attached to the channel.

Consistent with aspects described herein, inter-process communication (IPC) blocks may be defined that describe the connectivity of functional blocks in the deployed version of a model. The IPC blocks may describe the connectivity of the functional blocks independent of the communication channel(s) connecting the processing nodes. In an implementation, each IPC communication block may be associated with a label that designates the messages communicated by that IPC communication block. Connectivity between two IPC blocks can be automatically derived by matching different labels for IPC blocks. The actual connectivity of the channel may be independent of the logical connectivity of the IPC blocks.

Figure 8:
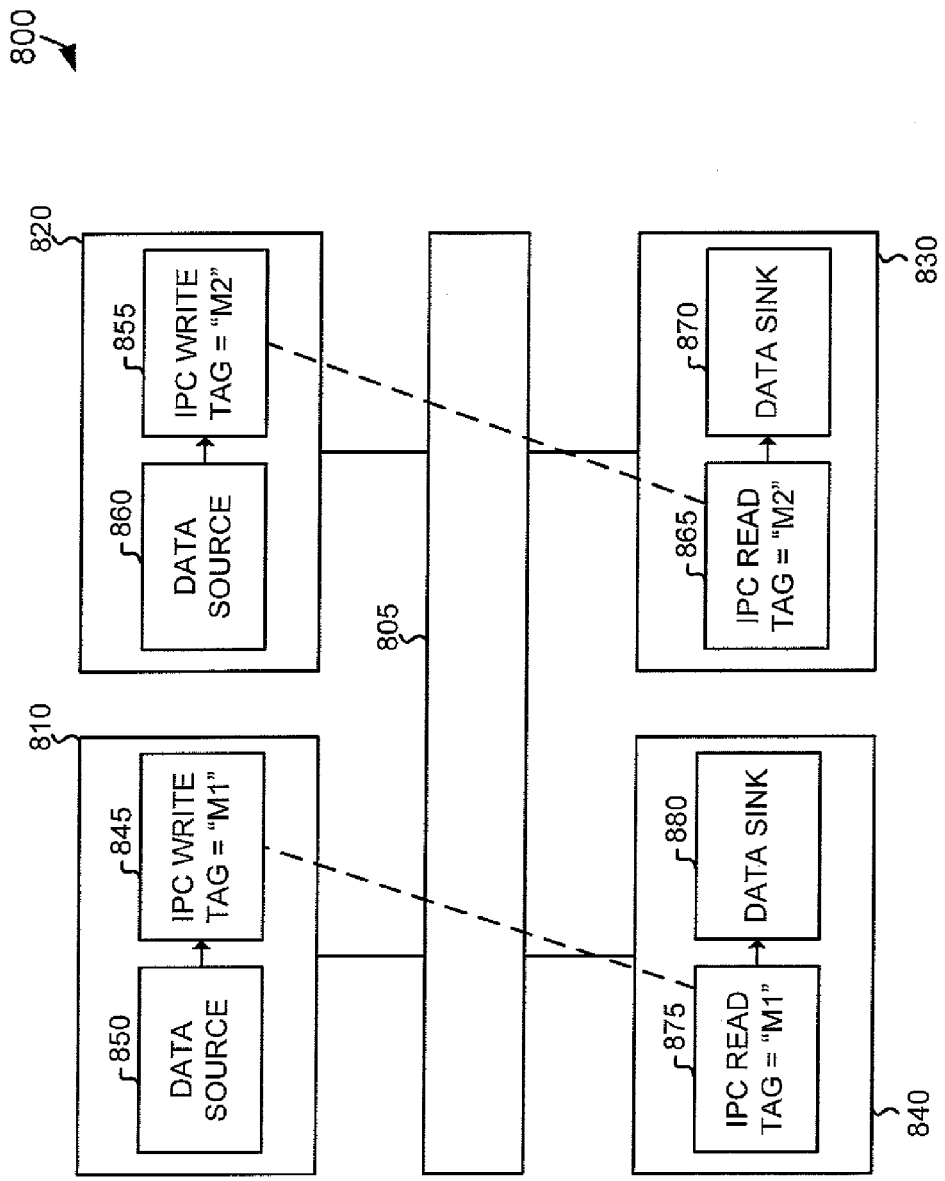
FIG. 8 is a diagram illustrating an exemplary model including inter-process communication (IPC) blocks.

FIG. 8 is a diagram illustrating an exemplary model 800 including IPC blocks. Model 800 may include an architectural model in which model 800 has been mapped. Model 800 includes four processor nodes 810, 820, 830, and 840, connected via a communication channel 805. IPC read and write blocks have been assigned to model 800, where the IPC blocks describe the connectivity of the functional blocks over communication channel 805. In particular, as shown in FIG. 8: in processor node 810, an IPC write block 845 connects a data source function block 850 with communication channel 805; in processor node 820, an IPC write block 855 connects a data source function block 860 with communication channel 805; in processor node 830, an IPC read block 865 connects a data sink function block 870 with communication channel 805; and in processor node 840, an IPC read block 875 connects a data sink function block 880 with communication channel 805.

IPC blocks 845, 855, 865, and 875 may be added to model 800 during, for instance, the design of the architectural model or the mapping of the functional model to the architectural model. GME 120 may provide a number of different types of IPC blocks that relate to inter-processor communication, such as the previously mentioned read blocks (e.g., read blocks 865 and 875) and write blocks (e.g., write blocks 845 and 855). Read blocks 865 and 875 may generally operate to provide an interface that receives data over communication channel 805 and provides it to one or more functional blocks. Write blocks 845 and 855 may generally operate to provide an interface that receives data from one or more functional blocks and transmits the data over communication channel 805. Additional types of IPC blocks, which perform different functions relating to inter-processor communications, may also be implemented by GME 120 and will be discussed in more detail below. Further, functions of one or more IPC blocks given herein may, in some implementations, be combined to be included in the functionality of a single block or separated into multiple different blocks. For example, in some implementations, the read and write IPC blocks may be implemented as a single read/write IPC block.

As shown in FIG. 8, an IPC read and write block may be associated with a tag assigned by the user or GME 120. IPC read block 875 and IPC write block 845 are associated with the tag "M1" while IPC read block 865 and IPC write block 855 are associated with the tag "M2". GME 120 may use the tags to determine which IPC read and write blocks should be connected, via communication channel 805, with one another. Thus, in the example of FIG. 8, IPC write block 855 should send its data to IPC read block 865 and IPC write block 845 should send its data to IPC read block 875. GME 120 may dynamically determine the appropriate IPC write block and read block connections based on the tags and subsequently use this information in various stages of model evaluation, compilation, simulation and/or code generation. By using tags in the IPC read and write blocks, the logical connectivity of the blocks can be separated from the actual connectivity of communication channel 805. This may provide for the ability to view each processor node in a functional view where all IPC reads and writes are translated to functional data inputs and outputs.

Separating the logical connectivity of the IPC blocks from the actual connectivity of communication channel 805 can advantageously allow for efficient substitution of different channels into a model. For example, a user may wish to simulate the operation of a model with multiple different types of channels before deciding on a particular channel to use in the final system.

In addition to specifying connectivity tags, in some implementations, the IPC read and write blocks may be associated with additional parameters that specify further functional details about the timing of the read or write operations, respectively. These parameters may be modified through GME 120. These additional parameters may be specified independently of the actual details of the communication interface represented by the read and write blocks.

The IPC write blocks may additionally include parameters relating to, for example, whether the write operation is blocking or non-blocking, whether the write operation is buffered and the buffer size, and whether the write operation can be executed conditionally (for example, by placing an IPC write block inside of a conditionally triggered subsystem), and whether the write operation may be attached to an Interrupt Service Routine (ISR) to begin an asynchronous task. For conditional execution of the write operation, the write operation may be specified to emit signals only at discrete time instances. The IPC read blocks may additionally include parameters relating to whether the read operation is blocking or non-blocking, whether the read operation is buffered and the buffer size, and whether the read operation may be attached to an ISR to begin an asynchronous task. In the case of the write and read operations being attached to an ISR, the ISR or the task may be initiated upon writing a message or receiving a message from a designated port.

In some implementations, the communication channel may also specify constraints on an operation mode (blocking/non-blocking), buffer sizes and triggering modes of the IPC blocks.

IPC read blocks 865 and 875, and IPC write blocks 845 and 855 can be conceptualized as blocks in the functional model 800 that correspond to data input ports and data output ports, respectively. The corresponding processor node may then be tested in a purely functional modeling environment. In addition, it may be desirable to validate that certain connections amongst IPC blocks are one-to-one or one-to-many. These constraints may be specified, for example, as a parameter of channel 805 itself. Examples of constraints that may be validated include, but are not limited to one-to-one connections, one-to-many connections, and many-to-one connections. Additionally, by using IPC read and write blocks, the functional connectivity of the model blocks does not necessarily depend on the actual details of the physical communication interface represented by the IPC read and write blocks The above-described IPC read blocks and write blocks may allow topological constraints that are specified for the architectural model to be validated independently of the representation of communication channel 805.

Figure 9:
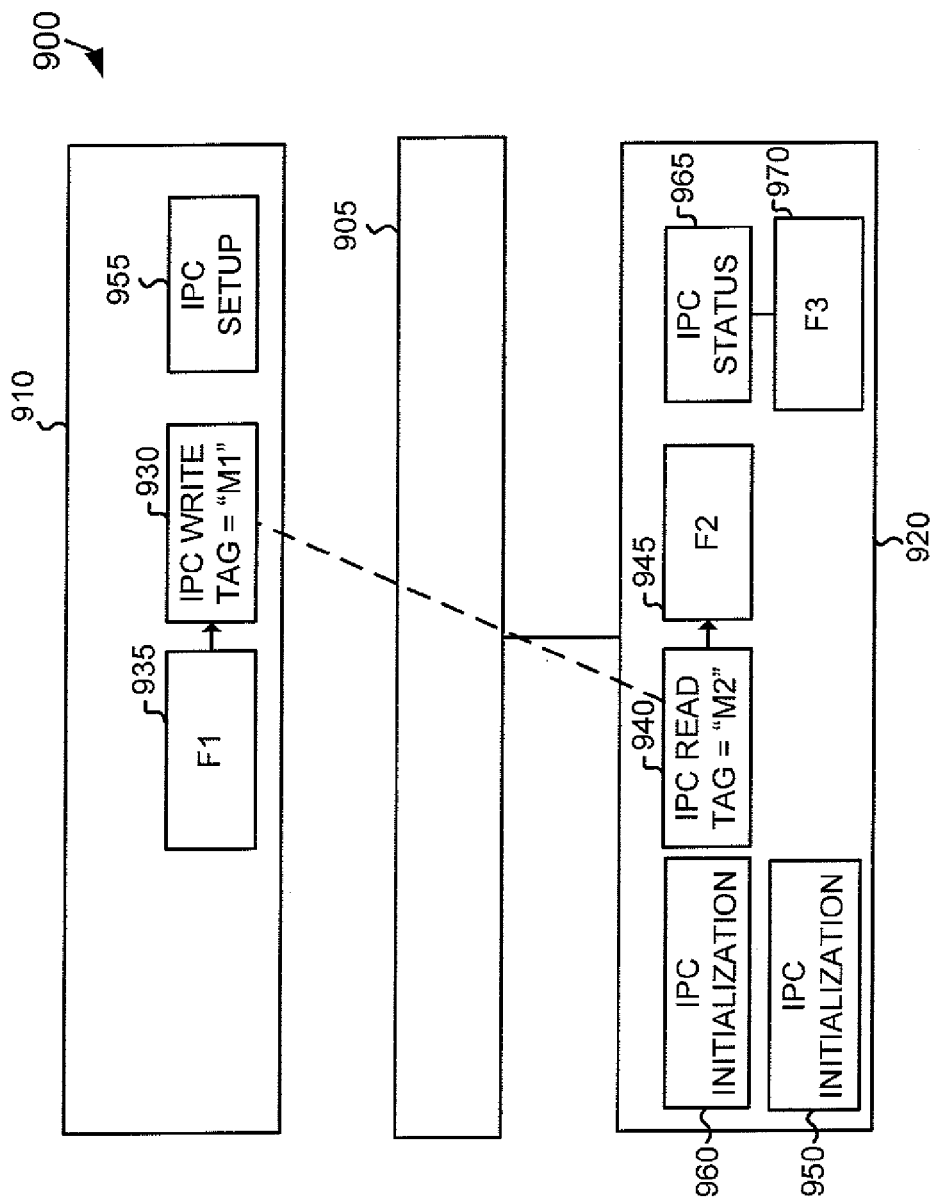
FIG. 9 is a diagram illustrating an exemplary model including additional types of IPC blocks.

In addition to IPC read blocks and IPC write blocks, GME 120 may provide additional IPC blocks that can be used to configure other aspects of an inter-processor communications interface. FIG. 9 is a diagram illustrating an exemplary model 900 including additional types of IPC blocks.

As shown in FIG. 9, model 900 includes a processor node 910 connected to a processor node 920 via a communication channel 905. A number of IPC blocks and functional model blocks are shown in processor nodes 910 and 920. The IPC blocks include: IPC write block 930, IPC read block 940, IPC initialization block 950, IPC setup block 955, IPC initialization block 960, and IPC status block 965. The functional blocks include: block F1 935, block F2 945, and block F3 970. Assume the functional blocks represent generic arbitrary functional blocks. Functional block F1 935 may function as a data source for IPC write block 930 and functional block F2 945 may function as a data sink for IPC read block 940.

IPC write block 930 and IPC read block 940 may function similarly to IPC write block 855 and IPC read block 865 (FIG. 8).

IPC initialization block 960 may be a block provided by GME 120 that logically groups functions and/or parameters that provide for the conditional initialization of an interface between processor node 920 and communication channel 905, potentially as a function of one or more input signals. In some implementations, certain aspects of the system, such as hardware relating to communication channel 905, may need to be initially configured. For example, for a synchronous bus, the data transmission rate for the bus may need to be configured. Parameters relating to IPC initialization block 960 may allow the user to control these initialization parameters. During run-time operation of the model, IPC initialization block 950 may initially, before operation of other blocks, initialize the channel interface. In some implementations, multiple IPC initialization blocks 960 may be used to initialize different aspects of the channel interface. As shown in FIG. 9, for instance, two IPC initialization blocks 950 and 960 are shown. Each may configure a different aspect of the channel interface. Furthermore, the "initialization" performed by IPC initialization block 950 may, in some implementations, occur during run-time to effectively dynamically re-initialize a communication interface during operation of the model.

IPC status block 965 may be a block provided by GME 120 that monitors the status of the channel interface and produces output signals that represent the monitored status. IPC status block 965 may also maintain a log of the status of the channel interface. IPC status block 965 may make the status of the interface available to other blocks as one or more variables or other data structures. For example, IPC status block 965 may provide an output indicating whether the interface is functioning normally, an output indicating whether an error or exception occurred, an output indicating the bandwidth of the interface, an output indicating whether a network connection is valid or dropped, an output indicating whether a serial interface is "ready to transmit" or "ready to receive," or other outputs. Other IPC blocks or model functional blocks may view the status of the interface by connecting to IPC status block 965. For instance, as shown in FIG. 9, functional block F3 970 may connect to IPC status block 965 to receive the status of the interface. IPC initialization blocks may also particularly connect to IPC status block 965. The IPC initialization block may, for instance, reinitialize the interface if the IPC status block indicates certain exceptional conditions are occurring in the interface. As some examples of exceptional conditions, a detectable fault may occur in the system for which a re-initialization may be desirable to invoke a back-up system to replace the faulty components. As another example, to avoid interference with other transmitters, the transmission power of a wireless transmitter may be recomputed during a re-initialization event. In another example, to transmit critical information, the bandwidth allocated to the IPC interface may be rebalanced as part of the re-initialization process.

IPC setup block 955 may be a block provided by GME 120 to specify parameters of a communication interface that are common to IPC read, write, initialization, or status blocks associated with that interface. IPC setup block 955 may configure (e.g., initialize, terminate) the communication interface and monitor the communication interface. Examples of the parameters that may be specified by IPC setup block 955 include an Internet Protocol (IP) address in a TCP/IP communication link, an interrupt request (IRQ) number of the communication device on a personal computer based processing node, or other vendor specific parameters of the communication device that may be driving the communication interface.

As previously mentioned, the communication channel itself may be modeled. Modeling the communication channel can be useful when simulating a model before final deployment of the model in its target system. More particularly, to support the logical connectivity discussed above between IPC read and write blocks, it may be important to validate the functional behavior of the communication channel such that the physical connection paths that follow the links in the channel are true to the logical paths. Consistent with aspects described herein, GME 120 may provide model connector blocks that function to aggregate messages being written to the communication channel.

Figure 10:
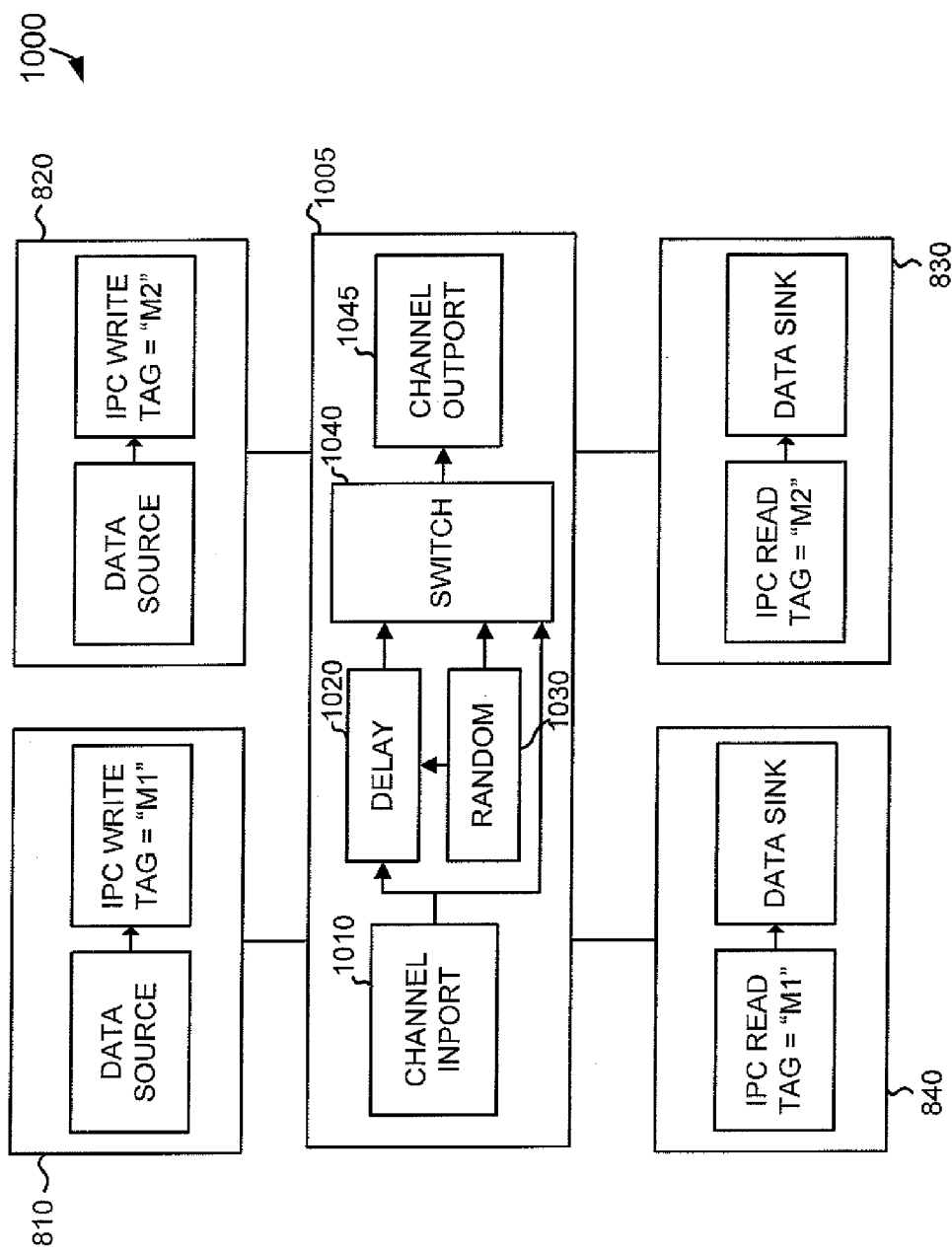
FIG. 10 is a diagram illustrating an exemplary model that includes functional blocks in a communication channel.

FIG. 10 is a diagram illustrating an exemplary model 1000. Model 1000 is similar to model 800 (FIG. 8), except that the communication channel, labeled as communication channel 1005, is shown in additional detail. Communication channel 1005 includes a channel inport block 1010, a delay block 1020, a random block 1030, a switch block 1040, and a channel outport block 1045.

Channel inport block 1010 may be a model connector block that may aggregate messages written to the channel by IPC write blocks connected to the channel. In FIG. 10, channel inport block 1010 may receive messages associated with the IPC write blocks that have tags "M1" and "M2." Channel inport block 1010 may aggregate the messages into a single bus signal (e.g., a Simulink® Bus signal)

Blocks 1020, 1030, and 1040 model communications through communication channel 1005 as a channel that may randomly delay some messages. It can be appreciated that other communication channels may be modeled using different functional blocks. Switch block 1040 may particularly represent a block that operates element-wise (i.e., on a message basis) on bus signals. For an element in the aggregate signal line, switch block 1040 may output either the current message or a time delayed version (corresponding to a communication delay) of the current message received from delay block 1020. The decision whether to output the current message or the time delayed version may be randomly determined based on the output of random block 1030.

Blocks 1020, 1030, and 1040 illustrate an exemplary model of a channel. In general, bus capable blocks can be used to model the behavior of any arbitrary channel.

Channel outport block 1045 may be a model connector block that may receive the messages from switch 1040 and provide the messages to the appropriate IPC read blocks. Channel outport block 1045 may be implemented so that channel outport block 1045 represents the aggregation of all messages being read from communication channel 1045 by the connected IPC read blocks.

Using channel inport block 1010 and channel outport block 1045 to aggregate messages, as described above, can realize a number of advantages. For instance, communication channel 1005 may model an ideal communication channel by ignoring duplicate labels at channel inport block 1010 and channel outport block 1045, and by directly connecting the channel inport block 1010 to channel outport block 1045. Additionally, as shown in FIG. 10, communication delay and data loss can be modeled for the channel by including delay blocks and switch blocks. Further, for a given model of communication channel 1005, logical connectivity of IPC read and IPC write blocks (as indicated by their labels) may be verified by performing a search on the model of the communication channel and verifying that the signal paths that originate from a particular label at a channel inport block is routed to the same label at the channel outport block. GME 120 may derive the structure (e.g., during compilation of the block diagram) of a signal bus at channel inport block 1010 and channel outport block 1045 as a function of the IPC read and IPC write blocks that are attached to the channel.

The structure of the signal bus may contain an element for a signal being written to the channel. The element may have the same functional properties (e.g., sample time, dimensions, frame mode) as a corresponding signal that is being transmitted by an IPC write block associated with the channel. Consequently, using, for example, Simulink® bus expansion technology, blocks 1020, 1030, and 1040, which are processing the signal bus, may also expand (e.g., for each a block, GME 120 may create a copy of the block for each element in the signal bus, where the copy may process an element of the signal bus, and may be compiled and interpreted to process the element with respect to the dimensions, sample time, and other functional properties of that element). Therefore, the model of the communication channel may not necessarily depend on the number of processing units and the number of IPC read and write blocks attached to the channel so that the channel may be reused in a different architectural model without changing its contents. Conversely, a communication channel may be replaced in a given architectural model with a different channel without changing the contents of the processing units that are connected to that channel. Further, existing bus signal logging technologies may be used to log data that is transmitted across the channel. Therefore, it may be possible to log and compute the dynamic behavior of the channel, such as the dynamic behavior of the channel described with terms such as bandwidth and congestion.

In some implementations, the channel signal sent over communication channel 1005 may be implemented using either fixed or variable size signals. Variable size signals may be used, for example, to represent variable size messages. Additionally, the channel signal may be decorated to include timing information to indicate the times at which a message is delivered.

In time-based operation, a complete execution period of model 1000 may include generating data at data source blocks (thereby producing the aggregate signal bus at the output of the channel inport 1010), generating a random number 1030, processing each element of the signal bus by the delay 1020, processing an element of the signal through the switch 1040, and using the data at the data sink blocks. The IPC read, IPC write, channel inport and channel outport may be virtual blocks. That is, they may specify connectivity of functional blocks in the nodes to functional blocks in the channel. They would not typically be implemented during the execution of model 1000. Instead, the actual deployed implementation of the channel would be used. Further, it is noted that the data source and data sink blocks may be arbitrary time based blocks, such as Simulink® blocks. Also, the delay and switch block that implement the channel behavior may be replaced by arbitrary time based blocks which are bus capable.

The operation of model 1000 may also be described in a data flow based domain. A difference is that blocks may run when data is made available to them at their input ports. Consequently, execution of model 1000 may include generating or receiving data at source blocks, generating a random number 1030, processing each element of the data bus by the delay 1020, processing an element of the signal through the switch 1040, and using the data at the data sink blocks.

Figure 11:
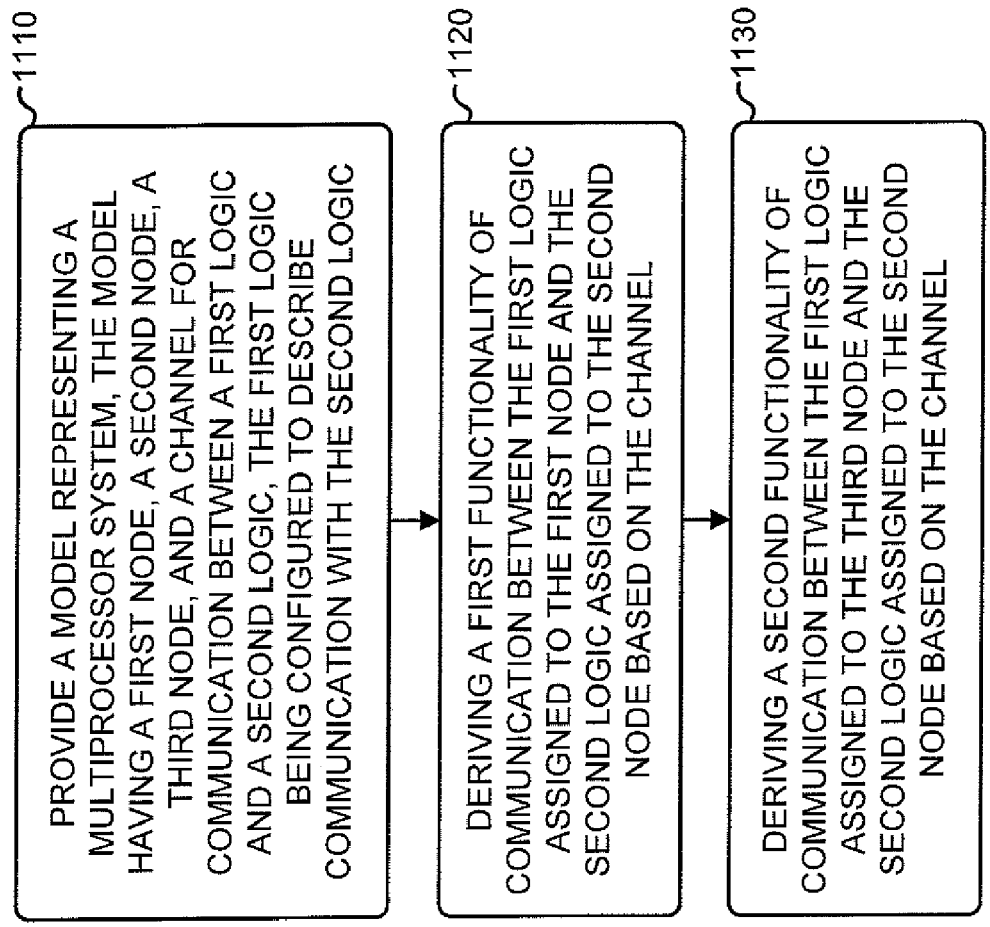
FIG. 11 is a flow chart illustrating exemplary operations that may be used to derive functionality of communication between nodes in a multiprocessor system.

FIG. 11 is a flow chart illustrating exemplary operations (acts) that may be used to derive functionality of communication between nodes in a multiprocessor system. Referring to FIG. 11, GME 120 may provide a model representing a multiprocessor system (block 1110). GME 120 may, for example, provide one or more graphical interfaces through which a user can arrange graphical blocks that represent functionality and/or data associated with the model, as described above. The model may have a first node, a second node, and a third node that are configured to represent, for example, a first, second, and third processor, respectively, in the multiprocessor system. The model may also include a channel for communication between a first logic and a second logic where the first logic is configured to describe communication with the second logic over the channel.

The GME 120 may derive a first functionality of communication between the first logic and the second logic based on the channel, where the first logic is assigned to the first node and the second logic is assigned to the second node (block 1120). The first logic may be assigned from the first node to the third node and the GME 120 may derive a second functionality of communication based on the channel (block 1130).

Figure 12A:
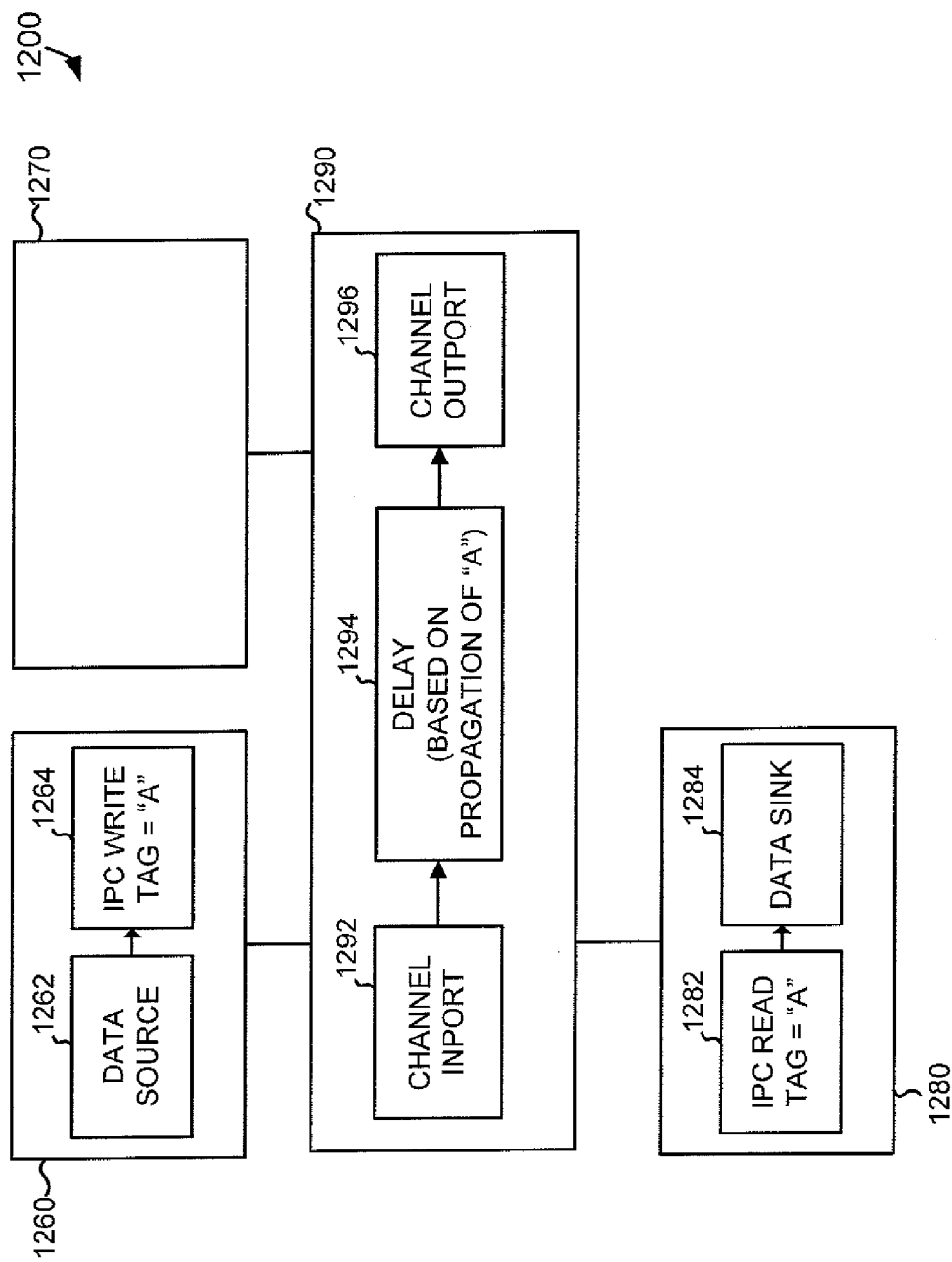
FIGS. 12A-B are diagrams illustrating an exemplary model of a multiprocessor system in which functionality of communication between nodes may be derived.
Figure 12B:
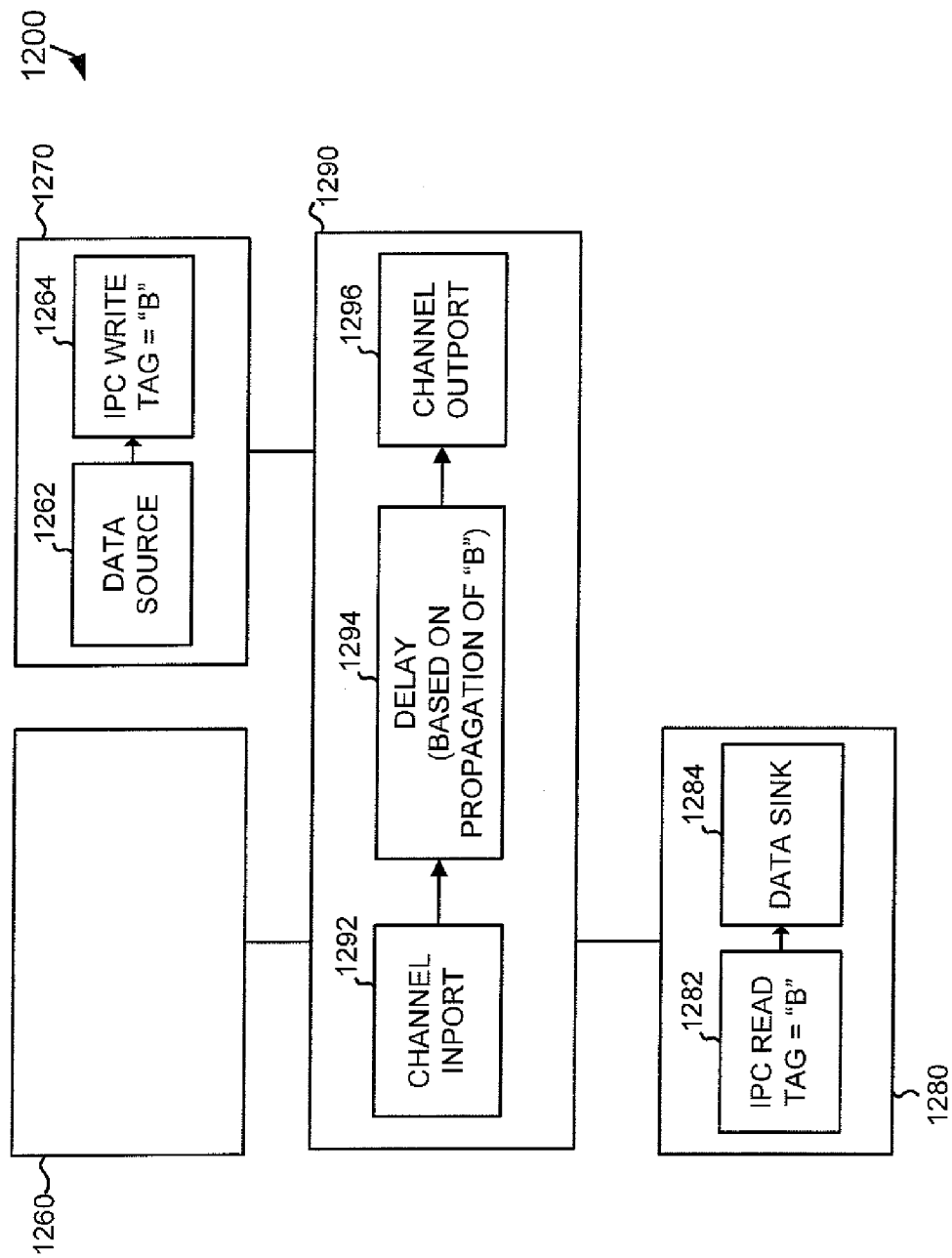

For example, FIGS. 12A-B are diagrams illustrating an exemplary model 1200 of a multiprocessor system in which functionality of communication between nodes is derived. Referring to FIG. 12A, model 1200 may be provided by GME 120 (block 1110). Model 1200 has three nodes 1260, 1270, and 1290, and two functional blocks 1262 and 1284. A first functional block 1262 is assigned to a first node 1260 and a second functional block 1284 is assigned to a second node 1280. The nodes 1260, 1270, and 1290 are connected via a channel 1290 having a channel inport block 1292, a delay block 1294, and a channel outport block 1296. In this instance, the GME 120 may derive a structure of a signal bus, which connects the two functional blocks 1262 and 1284 (block 1120). The signal bus may be derived according to (1) the label "A" specified in the IPC Read 1282 and IPC Write 1264 blocks and (2) properties of an IPC interface specified on the IPC Read 1282 and IPC Write 1264 blocks.

Referring now to FIG. 12B, we may consider the same system 1200 but with the first functional block 1262 and the IPC write block 1264 assigned to the third node 1270. The GME 120 may derive the structure of the signal bus differently, which connects the two functional blocks 1262 and 1284, to be consistent with the label "B" specified in the IPC Read 1282 and IPC Write 1264 blocks (block 1130). Here, the signal bus may be derived according to one or more properties of an IPC interface specified on the IPC Read block 1282 as present in processor 1280 and an IPC interface specified on the IPC Write block 1264 as present in processor 1270. In both cases above, a delay amount or delay parameters, associated with delay block 1294, and the structure of the signal bus, which connects functional blocks 1262 and 1284, may be derived from one or more properties of a node in which the assignment occurred and one or more properties of the IPC Read 1282 and IPC Write 1264 blocks.

In the discussion above, processor nodes 810, 820, 830, and 840 were described as connecting to a single communication channel over a single interface. In some implementations, a processor node may connect to multiple communication channels and specify multiple IPC ports labeled with unique identifiers. In this case, a tag on an IPC Reader or IPC Writer block may include multiple labels, such as a label of the form "X.Y", where 'X' denotes an interface on the processor node and 'Y' denotes the message identifier as discussed above. Different interfaces for a processor node may correspond to different ports on the same communication channel or to different ports on different communication channels.

The IPC blocks described above may be provided to users of GME 120 as preconfigured blocks that provide the functionality described previously. In some implementations, users may be additionally given an option to customize the IPC blocks, for example, through an application programming interface (API). For example, through the API, users may be given an option to extend the functionality of the IPC blocks. It can be desirable to customize the behavior of IPC blocks for validation, simulation, and for code generation.

In an implementation, the API may be implemented through callback functions to GME 120. Code that implements customizable aspects of the IPC blocks can be code programmed in any number of programming languages, such as C, C++, M, Java. The API may be designed to represent two sets of callback functions that can be called by the modeling system, one for use during simulation and the other for generating code for deployment on a real-time target.

FIG. 13 is a diagram illustrating a set of exemplary callback functions 1300 for an IPC read block for use during model simulation. The callback functions 1300 are particularly illustrated as callback functions for the Simulink modeling environment, although it can be appreciated that concepts described herein are not limited to this environment. The callback functions particularly include "Setup(blk)" callback function 1310, "CheckPrms(blk)" callback function 1120, and "DoPostProp(blk)" callback function 1330. Callback functions 1310, 1320, and 1330 may each take an argument, which may be an object that represents an instance of a run-time block representing the IPC read block (for example, the Simulink.RuntimeObject). The callback functions may use the run-time block to inspect the compiled properties of the block such as the dimensions and sample-times of the input and output ports of that block and may also inform the GME 120 by specifying compiled properties through the run-time block.

Setup callback function 1310 may be a function that is called by GME 120 at least each time the content of the callback function changes. In this callback, GME 120 may manipulate the run-time block object to add parameters to the represented block, which are parameters describing the characteristics of the IPC setup block. As shown in FIG. 1300, setup callback function 1310 is illustrated as calling a function named "addDialogPrm" method to register the "MessagePriority'" parameter and the "MessageHeaderSize'" parameter, which may describe the structure of a Controller Area Network (CAN) bus message. After a parameter is registered, the GME 120 may be later instructed, e.g., by a callback function, to display one or more user dialogs that allow the parameters to be viewed and/or edited.

GME 120 may provide services to display parameters for a block, allow a user to specify a value for a parameter, and to evaluate and return the value of the parameter to other callbacks specified for the block. GME 120 may provide dialog boxes such as an "edit box," a "combo box," and/or a "check box." For example, the call to function "addDialogPrm" in callback function 1110 for the MessageHeaderSize parameter specifies that a "combo box" should be displayed to the user for this parameter.

The CheckPrms callback function 1320 may be a callback function designed to check and validate the parameters that are specified by the user of the GME and IPC blocks. In FIG. 13, CheckPrms callback function 1320 is particularly illustrated as validating that the "MessagePriority" parameter was specified to be an integer larger than zero. The CheckPrms callback function may be invoked by the GME 120, for example, when a parameter value on the block is changed by a user, or when compiling the block diagram for execution, or during execution if the parameter value on the block is changed.

The DoPostProp callback function 1330 may be a callback function configured to register work areas or data stores that may be shared amongst different IPC blocks. GME 120 may ensure that storage is provided during simulation and code generation for the specified vectors. GME 120 may also provide a way for other callbacks to access the work vectors for reading and writing through a run-time block object. In FIG. 13, the DoPostProp callback function 1330 is particularly illustrated as registering a data store called "Handle," which may represent a handle to a bus device driver. The DoPostProp callback function may be invoked by the GME 120, for example, while compiling the block diagram after having determined the input and output properties of a block such as the dimensions, sample times, or data types of the input and output ports of that block.

It can be appreciated that additional or alternate callback functions, other than the examples given above, may be added based on requirements and operational semantics of the modeling environment.

FIG. 14 is a diagram illustrating a set of exemplary callback functions 1400 for an IPC setup block and an IPC read block for use during code generation for deployment on a real-time target. Callback functions 1400 are particularly illustrated as callback functions for the Simulink modeling environment, although it can be appreciated that concepts described herein are not limited to this environment. The callback functions shown in FIG. 14 may be invoked to emit real-time embedded code that can subsequently be deployed on a real-time embedded target. In this example, exemplary callbacks are shown for the known Target Language Compiler (TLC) language, available from The MathWorks, Incorporated. These callbacks may assume that the custom parameters for the IPC read block or write block corresponding to the callback have already been configured and that the functional properties of the block have been set and all work vectors have previously been registered in the simulation callbacks. Furthermore, the block diagram may be compiled so that all of the functional properties of blocks are compiled and known. Based on this, GME 120 may provide a code generation intermediate representation (CGIR) of the block as an argument to these callbacks. The CGIR may be generated by the GME 120 during code generation and may consist of information such as compiled attributes of the block (e.g., dimensions, data types), and also information regarding work areas and parameters registered on the block. In an implementation, the CGIR is a 'Block' record contained in a Real-Time Workshop® (RTW) File that may be produced during code generation by the Simulink® and Real-Time Workshop® products, both of which are available from The MathWorks, Incorporated.

The callback functions shown in FIG. 14 may particularly include "Start(blk)" callback function 1410, "Terminate" callback function 1420, and "Outputs(blk)" callback function 1430. Start callback function 1410 may be a function that emits code which is to be executed at an initialization time of the real-time embedded code. In the example of FIG. 14, start callback function 1410 is shown as a callback of an IPC setup block that initializes a device driver and stores an identity of the device driver in the "Handle" work vector. Terminate callback function 1420 may be a function that emits code that handles a shutdown of a device driver. Outputs callback function 1430 may be a callback function that emits code that is to be executed each time an IPC read block is invoked by the real-time system. As shown in FIG. 14, outputs callback function 1430 receives and uses the "MessagePriority" and "MessageHeaderSize" parameters to select appropriate data from the device driver.

It can be appreciated that additional callback functions, other than the examples given above, may be added based on requirements and operational semantics of the modeling environment. The additional callback functions may be added based on the requirements and operational semantics of the block diagram modeling environment.

It should be noted that IPC blocks, such as described above, may support sub-classing. For example, if one were to design IPC blocks for a CAN interface, one can design the base CAN interface IPC blocks to have identical parameters on their user-interfaces. Semantic methods of the superclass associated with the IPC blocks may be overridden by one or more hardware-specific subclasses that may provide specialized implementations of those methods. This may allow hardware vendors to seamlessly tie into a GME, such as GME 120, with a custom implementation of a generic hardware interface.

An alternate approach to obtaining hardware specific subclasses of IPC blocks may involve using a block-based registration approach. Here, the IPC blocks may be implemented in the GME in a generic fashion to support simulation semantics in the GME. Hardware-specific code, which may be generated by the GME, may be implemented using an API that may be associated with a generic block in the GME. A hardware configuration set may be used to register a block with the GME during a registration phase.

Figure 15:
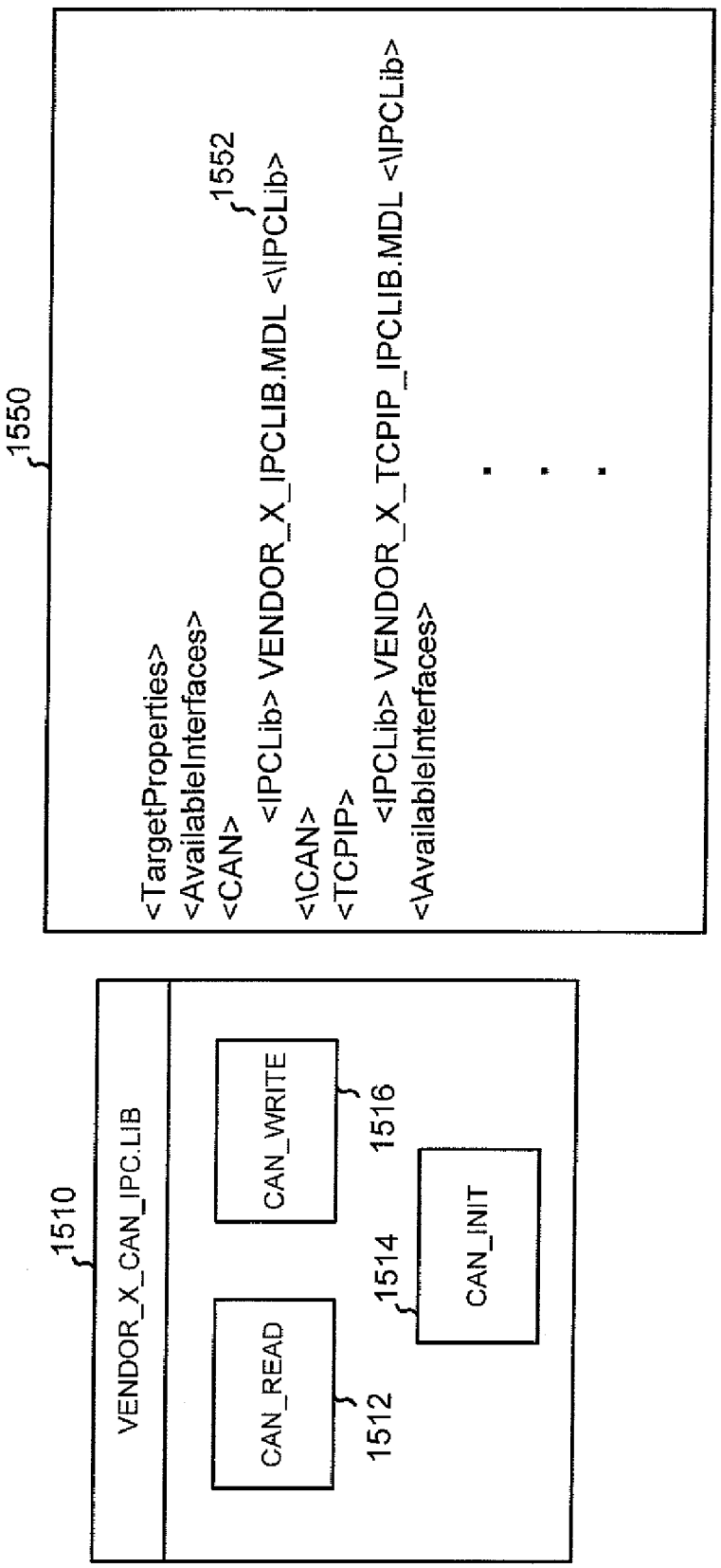
FIG. 15 is a diagram illustrating an exemplary library and configuration set.

For example, referring to FIG. 15, IPC read, IPC write, and IPC initialization blocks for a CAN interface for hardware provided by a vendor "X" may be implemented as three separate blocks using a standard block implementation API provided by the GME: CAN_READ 1512, CAN_WRITE 1516, and CAN_INIT 1514, respectively. These blocks may be placed in a block library 1510 and specified within the hardware configuration set 1550.

Now suppose that a user wants to set up a model to generate code for a hardware target provided by vendor X that uses the CAN interface. Dialog box 1650 in FIG. 16 associated with the model may be used to choose the target hardware for which the user wants to generate code. This dialog box displays and specifies various properties associated with the target configuration for the model based upon the hardware configuration set selected in box 1654. Note that the hardware configuration set may be specified in other ways, such as via drop-down menus, commands, etc. The interfaces tab 1652 may display a list 1656 of various interfaces that are specified in the hardware configuration set. Note that this tab may also display editable interface-level properties for each interface.

Figure 16:
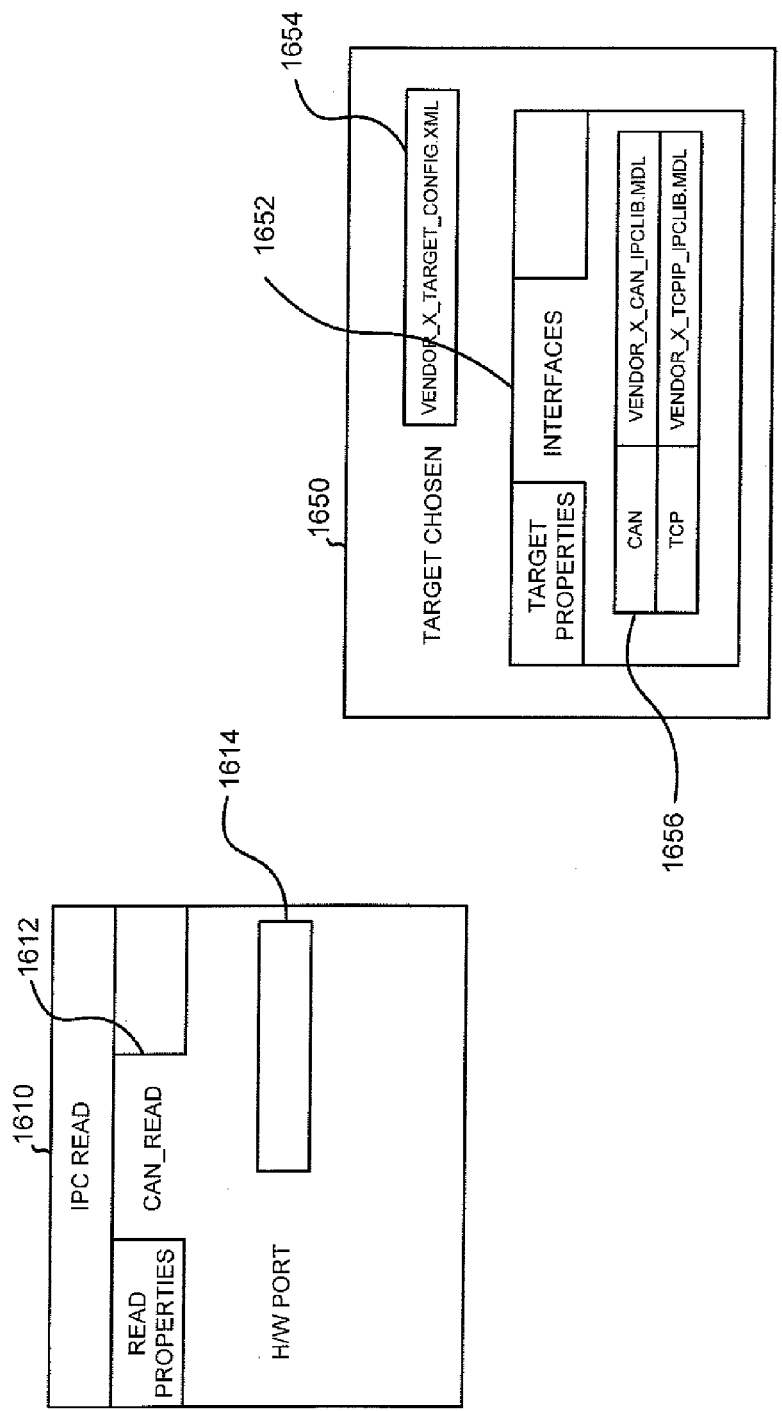
FIG. 16 is a diagram illustrating an exemplary properties dialog box for an IPC block and an exemplary properties dialog box for a model.

Referring also to FIG. 16, the IPC read, IPC write, and IPC initialize blocks in the model may have an additional tab, on parameter dialog boxes associated with the blocks, to allow entry of parameters specific to the hardware target. For example, dialog box 1610 may be a parameter dialog box for IPC Read block 1282 (FIG. 12A). The dialog box 1610 may include a tab 1612 that enables a user to specify various properties (e.g., hardware properties) of a CAN_READ 1512 block that may be associated with the IPC Read block 1282. In this example, a hardware (H/W) port for the CAN_READ block may be specified using edit box 1614.

After these parameters are configured, code specific to the hardware target of vendor X can be generated automatically from the GME. This may be accomplished in the GME by auto-inserting IPC blocks specific to target X, such as blocks 1512, 1516, and 1514, in place of generic IPC blocks in the model and have them perform code generation roles that are encoded into their implementation. This approach may enable reuse of existing APIs for generic blocks in the GME.

Although the above description discussed techniques for implementing communicating interfaces over a channel for models that included separate functional and architectural models, in some implementations, an architectural model may not be necessary. More particularly, a functional model may be created that includes communication links between elements of the functional model. The communication links may be specified independently, such as by modeling the communication channel, as described above, of what is communicated over the communication links.

CONCLUSION

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts have been described with regard to FIGS. 3 and 11, the order of the acts may be modified in other implementations. Further, non-dependent acts may be performed in parallel.

Also, the term "user" has been used herein. The term "user" is intended to be broadly interpreted to include, for example, a workstation or a user of a workstation.

It will be apparent that embodiments, as described herein, may be implemented in many different forms of software, firmware, wetware, and hardware in the implementations illustrated in the figures. The actual software code or specialized control hardware used to implement embodiments described herein is not limiting of the invention.

Further, certain portions of the invention may be implemented as "logic" that performs one or more functions. This logic may include hardware, such as an application specific integrated circuit or a field programmable gate array, software, or a combination of hardware and software.

It should be noted that one or more computer-readable media may store computer-executable instructions that when executed by a processing unit, such as processing unit 220, may perform various acts associated with one or more embodiments of the invention. The computer-readable media may be volatile or non-volatile and may include, for example, flash memories, removable disks, non-removable disks, and so on.

It should be further noted that various electromagnetic signals, such as wireless signals, electrical signals carried over a wire, optical signals carried over optical fiber, etc., may be encoded to carry computer-executable instructions, configured to implement one or more embodiments of the invention, on a network, such as, for example, network 130.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. One or more computer-readable media storing computer-executable instructions for execution by one or more processing devices, the computer-readable media storing one or more instructions for:
   providing a model representing a multiprocessor system, the model having a first node, a second node, a third node, and a channel for communication between a first logic and a second logic, the first logic being configured to describe communication with the second logic;
   deriving a first functionality of a communication between the first logic assigned to the first node and the second logic assigned to the second node based on the channel; and
   deriving a second functionality of a communication between the first logic assigned to the third node and the second logic assigned to the second node based on the channel.

2. The computer-readable media of claim 1 wherein the first functionality and the second functionality is derived based on at least one of properties associated with the channel, connectivity of the nodes, or a number of communications the channel can hold.

3. The computer-readable media of claim 1 wherein the first functionality of communication is the same as the second functionality of communication.

4. The computer-readable media of claim 1 the first functionality of communication is different from the second functionality of communication.

5. The computer-readable media of claim 1 wherein the first node and the second node are the same node.

6. The computer-readable media of claim 1 wherein the first functionality of communication or the second functionality of communication is represented in a graphical block diagram of the model as a line.

7. The computer-readable media of claim 1 wherein the first functionality of communication or the second functionality of communication are implemented as a path.

8. The computer-readable media of claim 1 wherein the first functionality of communication or the second functionality of communication is at least one of peer-to-peer, broadcast, multicast, or publish-subscribe.

9. The computer-readable media of claim 1 wherein the channel is a bus.

10. The computer-readable media of claim 1 wherein the first logic or the second logic is at least one of: computational functionality, control logic, signal processing logic, image processing logic, or fault detection logic.

11. The computer-readable media of claim 1 wherein the first functionality of communication or the second functionality of communication includes at least one of between the first logic and second logic: delay, protocol stack, bandwidth, latency, jitter, throughput, error rates, retransmit rates, congestion, conflict, signal strength, communication power, bit error rate (BER), packet error rate (PER), power spectrum, and signal-to-noise ratio.

12. The computer-readable media of claim 1 wherein the first node or the second node is at least one of: a processor, general processor, multi-core processor, application specific instruction-set processor (ASIP), graphics processor, field programmable gate array (FPGA), programmable logic device, application specific integrated circuit (ASIC), task, process, or thread.

13. The computer-readable media of claim 1 further storing one or more instructions for:
   specifying characteristics of the communication channel.

14. The computer-readable media of claim 1 wherein at least one of the first logic or the second logic are configurable using a predefined application programming interface (API).

15. The computer-readable media of claim 14 wherein the API includes support for error and exception handling.

16. The computer-readable media of claim 1 wherein at least one of the first logic or the second logic include initialization logic to provide for conditional initialization of an interface between a processor node and the communication channel.

17. The computer-readable media of claim 16 wherein the initialization logic includes an initialization block.

18. The computer-readable media of claim 1 wherein at least one of the first logic or the second logic includes a setup logic to provide for specification of one or more parameters that are common to a plurality of logic.

19. The computer-readable media of claim 18 wherein the setup logic includes a setup block.

20. The computer-readable media of claim 18 wherein the setup logic is configurable using a predefined API.

21. The computer-readable media of claim 18 wherein the API provides for specification of how code should be generated for a target hardware platform, topological constraints on connectivity of the communication channel, run-time properties of the communication channel, or testing behavior of the processor nodes.

22. The computer-readable media of claim 1 wherein at least one of the first logic or the second logic includes a setup block to store parameters for an interface between a processor node and the communication channel, the stored parameters being parameters that are common for multiple inter-process communication blocks and being used to setup the communication interface during simulation of the model.

23. The computer-readable media of claim 1 wherein the communication channel is implemented as a channel implemented over a network, shared memory access, or a physical bus.

24. The computer-readable media of claim 1 wherein the model is implemented as a block diagram, component diagram, or state transition diagram.

25. The computer-readable media of claim 1 further storing one or more instructions for:

provide an interface for selecting modifiable parameters, which relate to the functionality of the communication channel.

26. The computer-readable media of claim 1 wherein the interface is a graphical user interface (GUI).

27. The computer-readable media of claim 1 further storing one or more instructions for:

logging physical properties of the channel during a simulation of the model.

28. The computer-readable media of claim 1 wherein the communication channel in the multiprocessor system models multiple signals as a single bus signal.

29. The computer-readable media of claim 1 wherein at least one of the first logic or the second logic is configured to be pre-emptible.

30. The computer-readable media of claim 1 further storing one or more instructions for:

connecting at least one of the first logic or the second logic to at least one of the first functionality of communication or the second functionality of communication using an assembly connector.

31. The computer-readable media of claim 1 wherein the channel represents an assembly connector that connects the first logic with the second logic.

32. A method comprising:

providing, using a computing device, a model representing a multiprocessor system, the model having a first node, a second node, a third node, and a channel for communication between a first logic and a second logic, the first logic being configured to describe communication with the second logic;

deriving, using the computing device, a first functionality of a communication between the first logic assigned to the first node and the second logic assigned to the second node based on the channel; and deriving, using the computing device, a second functionality of a communication between the first logic assigned to the third node and the second logic assigned to the second node based on the channel.

33. A system comprising:

a processor configured to:

provide a model representing a multiprocessor system, the model having a first node, a second node, a third node, and a channel for communication between a first logic and a second logic, the first logic being configured to describe communication with the second logic, derive a first functionality of a communication between the first logic assigned to the first node and the second logic assigned to the second node based on the channel, and derive a second functionality of a communication between the first logic assigned to the third node and the second logic assigned to the second node based on the channel.

34. An apparatus comprising:

means for providing a model representing a multiprocessor system, the model having a first node, a second node, a third node, and a channel for communication between a first logic and a second logic, the first logic being configured to describe communication with the second logic;

means for deriving a first functionality of a communication between the first logic assigned to the first node and the second logic assigned to the second node based on the channel; and means for deriving a second functionality of a communication between the first logic assigned to the third node and the second logic assigned to the second node based on the channel.

* * * * *